(12) United States Patent
Hsu et al.

(10) Patent No.: US 8,791,924 B2
(45) Date of Patent: Jul. 29, 2014

(54) DISTANCE MEASURING DEVICE, 3D IMAGE-SENSING DEVICE, AND OPTICAL TOUCH SYSTEM

(75) Inventors: En-Feng Hsu, Hsin-Chu (TW); Han-Chi Liu, Hsin-Chu (TW); Chih-Hung Lu, Hsin-Chu (TW); Ming-Tsan Kao, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 1021 days.

(21) Appl. No.: 12/817,172

(22) Filed: Jun. 16, 2010

(65) Prior Publication Data

US 2011/0134078 A1 Jun. 9, 2011

(30) Foreign Application Priority Data

Dec. 3, 2009 (TW) ................................ 98141344 A

(51) Int. Cl.
  *G06F 3/042* (2006.01)
(52) U.S. Cl.
  USPC ........................................................ 345/175
(58) Field of Classification Search
  USPC ................ 345/175, 173, 156; 356/5.01–5.09; 348/46, E13.074
  See application file for complete search history.

(56) References Cited

U.S. PATENT DOCUMENTS

| | | | |
|---|---|---|---|
| 5,808,726 A | 9/1998 | Egawa | |
| 5,946,081 A | 8/1999 | Lai | |
| 6,678,039 B2 | 1/2004 | Charbon | |
| 6,871,017 B2 | 3/2005 | Numako | |
| 7,006,142 B2 | 2/2006 | Seo | |
| 7,009,690 B2 | 3/2006 | Kamon | |
| 7,186,965 B2 | 3/2007 | Schrey | |
| 7,212,278 B2 | 5/2007 | Doemens | |
| 7,742,637 B2 | 6/2010 | Xiao | |
| 7,847,260 B2 | 12/2010 | Inbar | |
| 8,514,375 B2 | 8/2013 | Hsu | |
| 2001/0046317 A1 | 11/2001 | Kamon | |
| 2002/0015144 A1 | 2/2002 | Seo | |
| 2009/0009622 A1 | 1/2009 | Yoshida | |
| 2009/0128829 A1 | 5/2009 | Schillke | |
| 2009/0219251 A1* | 9/2009 | Jung et al. ...................... 345/170 |
| 2009/0244018 A1 | 10/2009 | Lin | |
| 2009/0262098 A1 | 10/2009 | Yamada | |
| 2010/0231692 A1* | 9/2010 | Perlman et al. ................. 348/48 |
| 2011/0134222 A1* | 6/2011 | Yahav ............................. 348/46 |
| 2012/0268727 A1* | 10/2012 | Schrey et al. ................ 356/5.01 |

FOREIGN PATENT DOCUMENTS

| | | | |
|---|---|---|---|
| JP | 2001337166 A | 12/2001 | |
| JP | 2002315033 A | 10/2002 | |

(Continued)

*Primary Examiner* — William Boddie
*Assistant Examiner* — Jeffrey A Parker
(74) *Attorney, Agent, or Firm* — Winston Hsu; Scott Margo

(57) ABSTRACT

A distance-measuring device includes a light-emitting/sensing controlling circuit, a light-emitting component, a light-sensing group, a background-calculating circuit, a frequency-adjusting circuit, and a distance-calculating circuit. The light-emitting component emits a detecting light to a measured object. The light-emitting/sensing controlling circuit controls the light-sensing group receiving and accumulating the energy of a reflective light generated by the measured object reflecting the detecting light, so that the distance-calculating circuit can calculate a measured distance between the measured object and the distance-measuring device according the accumulated energy of the light-sensing group. In addition, the distance-measuring device calculates the energy accumulated by the light-sensing group sensing the background light per unit time, by means of the background-calculating circuit. In this way, the effect of the background light is reduced so that the distance-measuring device can more correctly calculate the measured distance.

26 Claims, 16 Drawing Sheets

(56) References Cited

FOREIGN PATENT DOCUMENTS

| | | |
|---|---|---|
| JP | 3471957 | 12/2003 |
| TW | 374114 | 11/1999 |
| TW | 200514966 | 5/2005 |
| TW | 200714867 | 4/2007 |
| TW | 200900658 | 1/2009 |
| TW | M364920 | 9/2009 |
| WO | WO2009/127347 | * 10/2009 .............. G01S 17/10 |

* cited by examiner

DISTANCE MEASURING DEVICE, 3D IMAGE-SENSING DEVICE, AND OPTICAL TOUCH SYSTEM

BACKGROUND OF THE INVENTION

1. Field of the Invention

The present invention is related to a distance-measuring device, and more particularly, to a distance-measuring device of calculating a measured distance between the distance-measuring device and a measured object according to the period of a detecting light going back and forth between the distance-measuring device and the measured object.

2. Description of the Prior Art

In the prior art, the distance-measuring device emits a detecting light to a measured object, and receives the reflected light generated by the measured object reflecting the detecting light. The distance-measuring device calculates the distance between the distance-measuring device and the measured object by means of measuring the period of the detecting light going back and forth between the distance-measuring device and the measured object. However, when the reflectivity of the surface of the measured object is lower, the energy of the reflected light generated by the measured object is lower as well. Thus, the distance-measuring device is easily affected by the background light (noise) so that the distance-measuring device may obtain an incorrect measured distance.

SUMMARY OF THE INVENTION

The present invention provides a distance-measuring device. The distance-measuring device comprises a light-emitting/sensing controlling circuit, a light-emitting component, a light-sensing group, and a distance-calculating circuit. The light-emitting/sensing controlling circuit is utilized for generating a light-emitting periodic signal, a first shutter periodic signal, a second shutter periodic signal, a phase signal, a frequency-detecting signal, and a reading signal. The light-emitting periodic signal, the first shutter periodic signal, and the second shutter periodic signal have a same detecting frequency. The light-emitting periodic signal and the first shutter periodic signal are substantially in phase. A phase of the light-emitting periodic signal is substantially opposite to a phase of the second shutter periodic signal. The frequency-detecting signal indicates a magnitude of the detecting frequency. The light-emitting component is utilized for emitting a detecting light to a measured object according to the light-emitting periodic signal. The light-sensing group is utilized for sensing and accumulating an energy of a reflected light generated by the measured object reflecting the detecting light according to the first shutter periodic signal so as to generate a first light-sensing signal, and outputting the first light-sensing signal according to the reading signal, and sensing and accumulating the energy of the reflected light generated by the measured object reflecting the detecting light according to the second shutter periodic signal so as to generate a second light-sensing signal, and outputting the second light-sensing signal according to the reading signal. The distance-calculating circuit is utilized for calculating a measured distance between the distance-measuring device and the measured object according to the phase signal, the first light-sensing signal, the second light-sensing signal, and the frequency-detecting signal.

The present invention further provides a 3D image-sensing device. The 3D image-sensing comprises a light-emitting/sensing controlling circuit, a light-emitting component, a light-sensing module, a light-sensing module, a distance-calculating circuit, and an image-sensing controlling circuit. The light-emitting/sensing controlling circuit is utilized for generating a light-emitting periodic signal, a first shutter periodic signal, a second shutter periodic signal, a phase signal, a frequency-detecting signal, and a reading signal. The light-emitting periodic signal, the first shutter periodic signal, and the second shutter periodic signal have a same detecting frequency. The light-emitting periodic signal and the first shutter periodic signal are substantially in phase. A phase of the light-emitting periodic signal is substantially opposite to a phase of the second shutter periodic signal. The frequency-detecting signal indicates a magnitude of the detecting frequency. The light-emitting component is utilized for emitting a detecting light to a scene according to the light-emitting periodic signal. The scene comprises M reflecting points. The light-sensing module is utilized for generating M first light-sensing signals and M second light-sensing signals, the light-sensing module comprising M light-sensing groups. A $K^{th}$ light-sensing group of the M light-sensing groups comprises a first light-sensing component, and a second light-sensing component. The first light-sensing group of the $K^{th}$ light-sensing group of the M light-sensing groups is utilized for sensing and accumulating an energy of a reflected light, which is generated by a $K^{th}$ reflecting point of the M reflecting points reflecting the detecting light, according to the first shutter periodic signal, so as to generate a $K^{th}$ first light-sensing signal of the M first light-sensing signals, and outputting the $K^{th}$ first light-sensing signal of the M first light-sensing signals according to the reading signal. The second light-sensing group of the $K^{th}$ light-sensing group of the M light-sensing groups is utilized for sensing and accumulating an energy of the reflected light, which is generated by the $K^{th}$ reflecting point of the M reflecting points reflecting the detecting light, according to the second shutter periodic signal, so as to generate a $K^{th}$ second light-sensing signal of the M second light-sensing signals, and outputting the $K^{th}$ second light-sensing signal according to the reading signal. The distance-calculating circuit is utilized for calculating M measured distances between the 3D image-sensing device and the M reflecting points of the scene according to the phase signal, the M first light-sensing signals, the M second light-sensing signals, and the frequency-detecting signal. The image-sensing controlling circuit is utilized for controlling the M light-sensing groups of the light-sensing module sensing the scene to generate a 2D image, the 2D image comprising (2×M) sub-pixel image data. The image-sensing controlling circuit respectively controls the first and the second light-sensing components of the $K^{th}$ light-sensing group of the M light-sensing groups sensing the $K^{th}$ reflecting points of the scene so as to obtain a $(2 \times K)^{th}$ sub-pixel image data and a $(2 \times K-1)^{th}$ sub-pixel image data of the (2×M) sub-pixel image data. M and K are positive integers, and $1 \leq K \leq M$.

The present invention further provides an optical touch system. The optical touch system comprises a display, a first 3D image-sensing device, and a location-calculating circuit. The display is utilized for displaying images. The first 3D image-sensing device is utilized for detecting at least an indicating object so as to accordingly output a measured distance and a measured angle between the indicating object and the first 3D image-sensing device. An angle between the first 3D image-sensing device and the display is a first predetermined internal angle. The location-calculating circuit is utilized for calculating a location of the indicating object on the display according to the measured distance, the measured angle, and the first predetermined internal angle.

DETAILED DESCRIPTION

Figure 1:
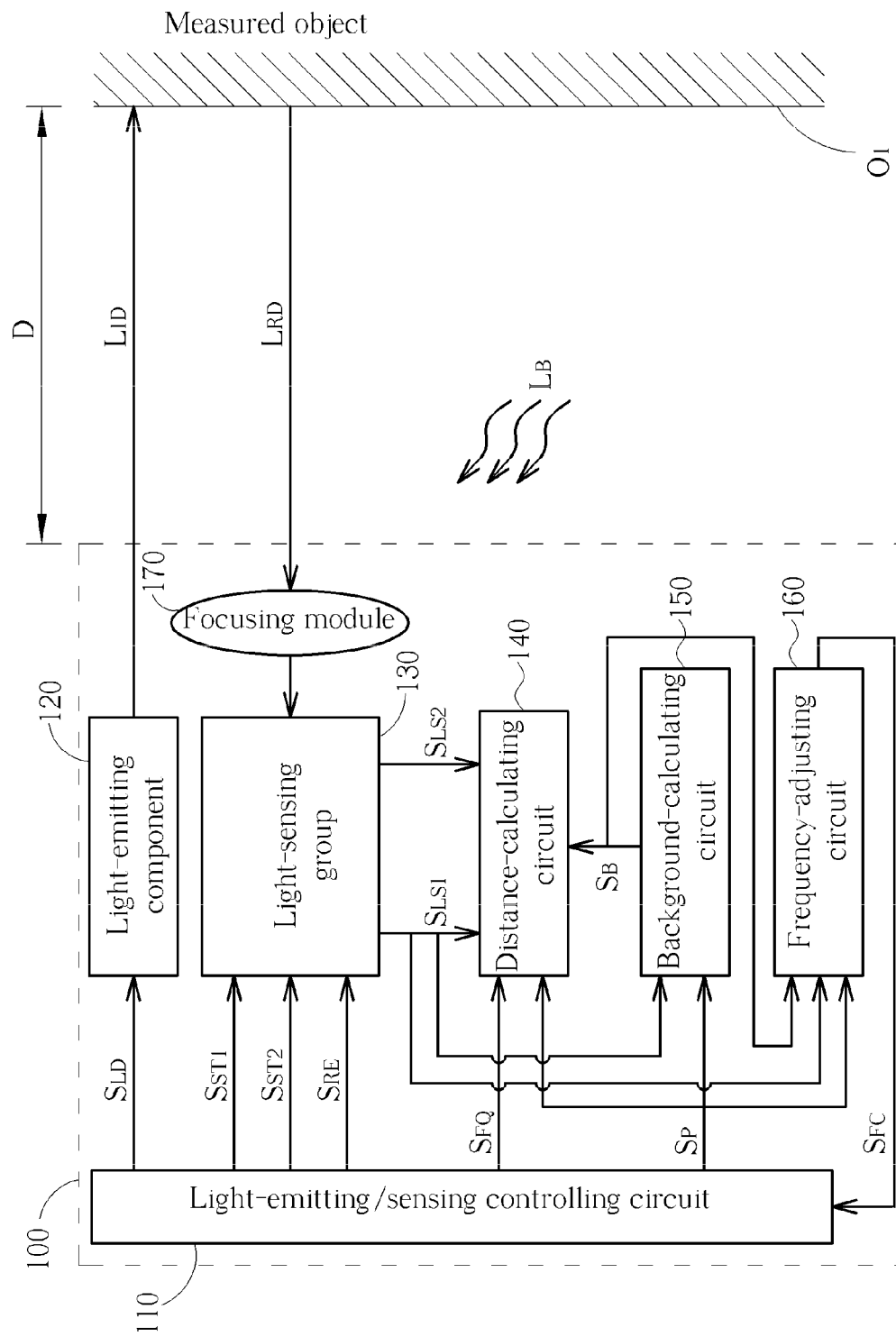
FIG. 1 is a diagram illustrating a distance-measuring device according to a first embodiment of the present invention.

Please refer to FIG. 1. FIG. 1 is a diagram illustrating a distance-measuring device 100 according to a first embodiment of the present invention. The distance-measuring device 100 is utilized for measuring the measured distance D, wherein the measured distance D is the distance between the measured object $O_1$ and the distance-measuring device 100, as shown in FIG. 1. The distance-measuring device 100 comprises a light-emitting/sensing controlling circuit 110, a light-emitting component 120, a light-sensing group 130, a distance-calculating circuit 140, a background-calculating circuit 150, a frequency-adjusting circuit 160, and a focusing module 170.

The light-emitting/sensing controlling circuit 110 is utilized for generating a light-emitting periodic signal $S_{LD}$, shutter periodic signals $S_{ST1}$ and $S_{ST2}$, a phase signal $S_P$, a frequency-detecting signal $S_{FQ}$, and a reading signal $S_{RE}$. The light-emitting periodic signal $S_{LD}$, and the shutter periodic signals $S_{ST1}$ and $S_{ST2}$ have the same frequency. The frequency-detecting signal $S_{FQ}$ indicates the magnitude of the frequency of the light-emitting periodic signal $S_{LD}$, and the shutter periodic signals $S_{ST1}$ and $S_{ST2}$, which means when a device receives the frequency-detecting signal $S_{FQ}$, the device obtains the magnitude of the frequency of the light-emitting periodic signal $S_{LD}$. In addition, the phases of the light-emitting periodic signal $S_{LD}$ and the shutter periodic signal $S_{ST1}$ are approximately the same (in phase), and the phase of the light-emitting periodic signal $S_{LD}$ is approximately opposite to that of the shutter periodic signal $S_{ST2}$.

The light-emitting component 120 may be a Light-Emitting Diode (LED). The light-emitting component 120 emits a detecting light $L_{ID}$ to the measured object $O_1$ according to the light-emitting periodic signal $S_{LD}$. For example, when the light-emitting periodic signal $S_{LD}$ represents "emitting", the light-emitting component 120 emits the detecting light $L_{ID}$; otherwise, when the light-emitting periodic signal $S_{LD}$ represents "not-emitting", the light-emitting component 120 does not emit the detecting light $L_{ID}$.

The focusing module 170 is utilized for focusing the reflected light $L_{RD}$, which is generated by the measured object $O_1$ reflecting the detecting light $L_{ID}$, to the light-sensing group 130.

The light-sensing group 130 is a Charge Coupled Device (CCD) or a Complementary Metal-Oxide-Semiconductor (CMOS) light sensor. The light-sensing group 130 senses and accumulates the energy of the reflected light $L_{RD}$ according to the shutter periodic signal $S_{ST1}$. In addition, the light-sensing group 130 outputs the light-sensing signal $S_{LS1}$ according to the reading signal $S_{RE}$. For instance, when the shutter periodic signal $S_{ST1}$ represents "turning-on", the light-sensing group 130 senses the energy of the reflected light $L_{RD}$ so as to accordingly accumulate the energy $E_{R1}$; when the shutter periodic signal $S_{ST1}$ represents "turning-off", the light-sensing group 130 does not sense the energy of the reflected light $L_{RD}$, and does not accumulate the energy $E_{R1}$. When the reading signal $S_{RE}$ represents "reading", the light-sensing group 130 outputs the light-sensing signal $S_{LS1}$ according to the accumulated energy $E_{R1}$. Besides, the light-sensing group 130 also senses and accumulates the energy of the reflected light $L_{RD}$ according to the shutter periodic signal $S_{ST2}$, and the light-sensing group 130 outputs the light-sensing signal $S_{LS2}$ according to the reading signal $S_{RE}$ as well. For instance, when the shutter periodic signal $S_{ST2}$ represents "turning-on", the light-sensing group 130 senses the energy of the reflected light $L_{RD}$ so as to accordingly accumulate the energy $E_{R2}$; when the shutter periodic signal $S_{ST2}$ represents "turning-off", the light-sensing group 130 does not sense the energy of the reflected light $L_{RD}$, and does not accumulate the energy $E_{R2}$. When the reading signal $S_{RE}$ represents "reading", the light-sensing group 130 outputs the light-sensing signal $S_{LS2}$ according to the accumulated energy $E_{R2}$. In addition, it is noticeable that after the light-sensing group 130 outputs the light-sensing signals $S_{LS1}$ and $S_{LS2}$ according to the reading signal $S_{RE}$ representing "reading", the light-sensing group 130 resets the accumulated energy $E_{R1}$ and $E_{R2}$ (which means the light-sensing group 130 releases the accumulated energy $E_{R1}$ and $E_{R2}$)

The background-calculating circuit 150 outputs the background signal $S_B$ according to the phase signal $S_P$ and the light-sensing signal $S_{LS1}$.

The frequency-adjusting circuit 160 outputs the frequency-controlling signal $S_{FC}$ according to the phase signal $S_P$ and the light-sensing signal $S_{LS1}$. The distance-calculating circuit 140 calculates the measured distance D between the measured object $O_1$ and the distance-measuring device 100 according to the phase signal $S_P$, the background signal $S_B$, the light-sensing signals $S_{LS1}$ and $S_{LS2}$, and the frequency-detecting signal $S_{FQ}$.

When the distance-measuring device 100 measures the measured distance D, the measuring process includes a "background-measuring phase", a "frequency-adjusting phase", and a "distance-calculating phase". The operation principle of each phase is illustrated in detail as below.

Figure 2:
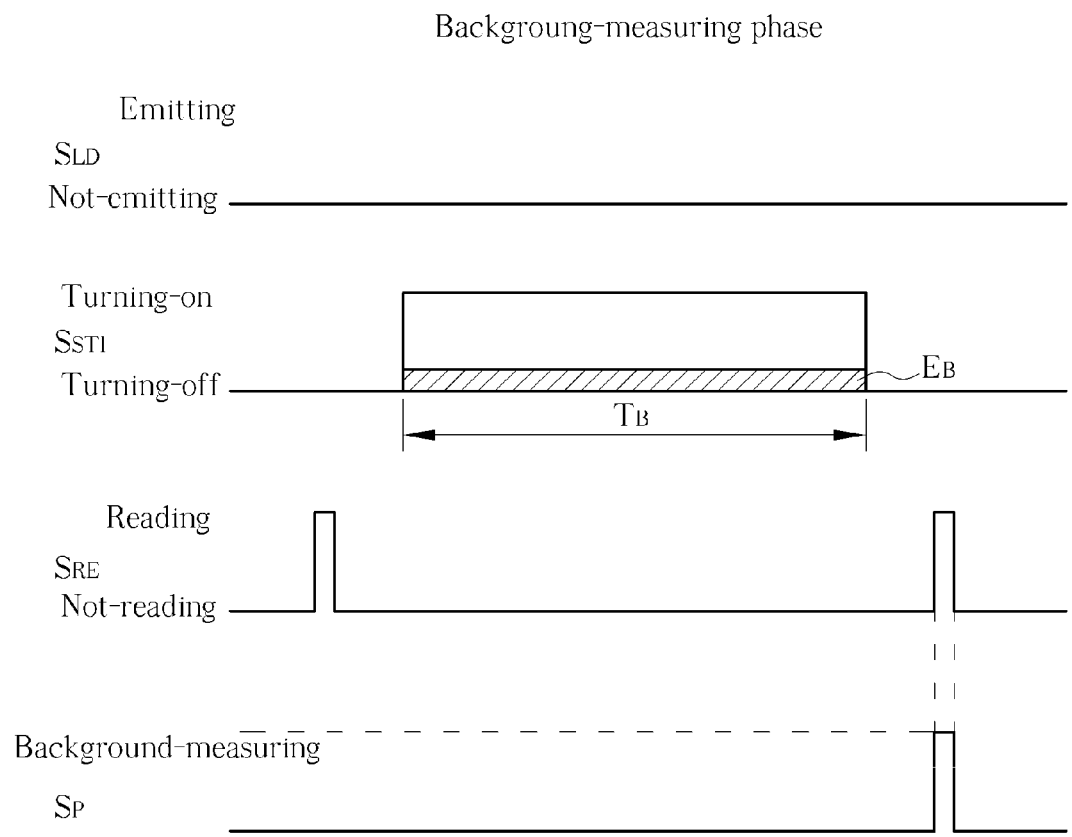
FIG. 2 is a waveform diagram of the control signals of the distance-measuring device in the "background-measuring phase".

Please refer to FIG. 2. FIG. 2 is a waveform diagram of the control signals of the distance-measuring device 100 in the "background-measuring phase". When the distance-measuring device 100 enters the "background-measuring phase", the distance-measuring device 100 measures the energy of the background light $L_B$ sensed by the light-sensing group 130 per unit time, so that the distance-measuring device 100 can reduce the effect of the background light $L_B$ in the "distance-calculating phase". At the beginning of the "background-measuring phase", the light-emitting/sensing controlling circuit 110 generates the reading signal $S_{RE}$ representing "reading" so as to reset the accumulated energy of the light-sensing group 130. Then, the light-emitting/sensing controlling circuit 110 generates the shutter periodic signal $S_{ST1}$ having a pulse width $T_B$, wherein $T_B$ represents a background-measuring period. Meanwhile, since the light-emitting periodic signal $S_{LD}$ represents "not-emitting", the light-emitting component 120 does not emit the detecting light $L_{ID}$. Hence, instead of the light-sensing group 130 sensing the energy of the reflected light $L_{RD}$, the light-sensing group 130 only senses the energy of the background light $L_B$ so as to accumulate the energy $E_B$ corresponding to the background light $L_B$. After the background-measuring period $T_B$, the shutter periodic signal $S_{ST1}$ change to be "turning-off". Meanwhile, the light-emitting/sensing controlling circuit 110 simultaneously generates the reading signal $S_{RE}$ representing "reading" and the phase signal $S_P$ representing "background-measuring", so that the light-sensing group 130 outputs the light-sensing signal $S_{LS1}$ according to the accumulated energy $E_B$, and the background-calculating circuit 150 outputs the background signal $S_B$ to the distance-calculating circuit 140 according to the frequency-detecting signal $S_{FQ}$ and the light-sensing signal $S_{LS1}$. The value of the background signal $S_B$ represents the energy of the background light $L_B$ sensed by the light-sensing group 130 per unit time and can be represented as the following formula:

$$S_B = E_B/T_B \quad (1);$$

wherein $E_B$ is the total energy accumulated by the light-sensing group 130 sensing the background light $L_B$ in the background-measuring period $T_B$.

Figure 3:
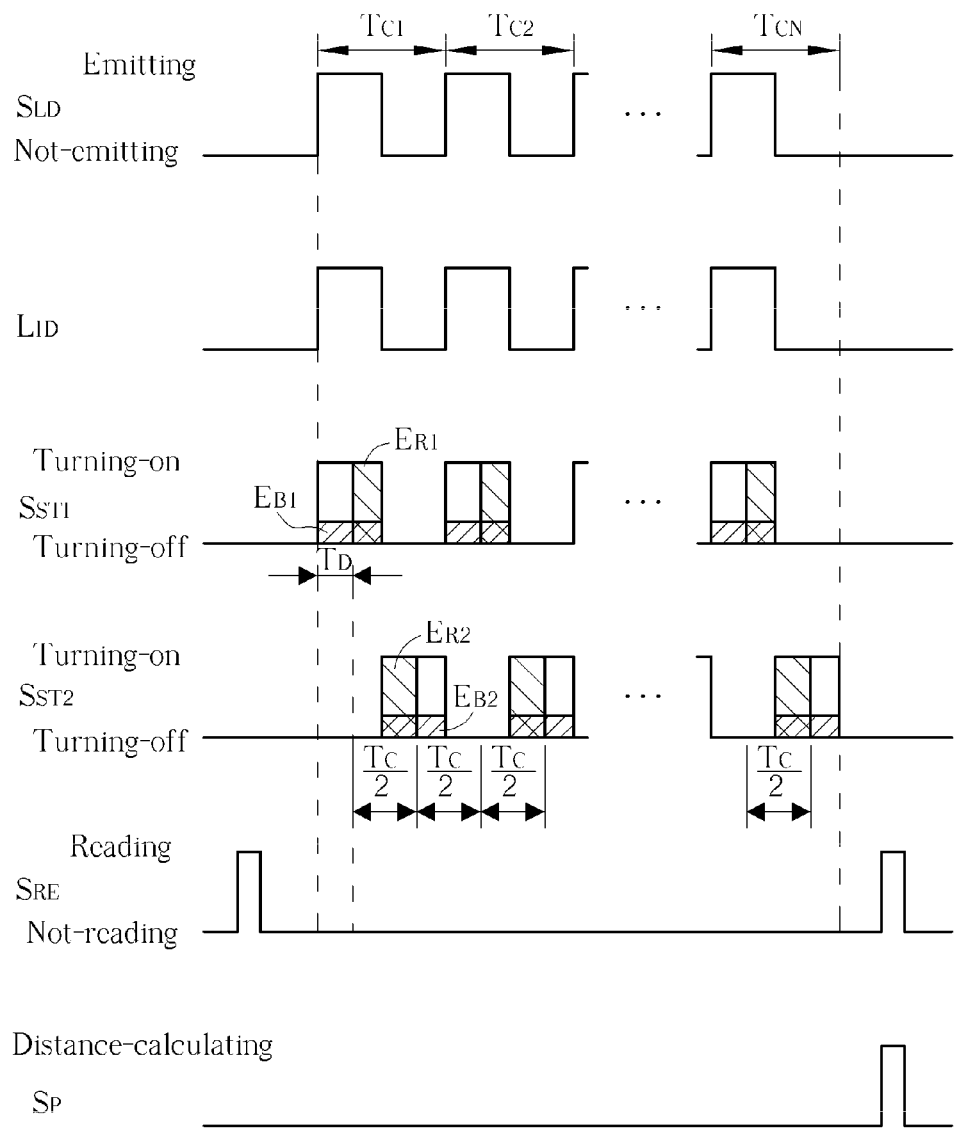
FIG. 3 is a waveform diagram of the control signals of the distance-measuring device in the "distance-calculating phase".

Please refer to FIG. 3. FIG. 3 is a waveform diagram of the control signals of the distance-measuring device 100 in the "distance-calculating phase". When the distance-measuring device 100 enters the "distance-calculating phase", the distance-measuring device 100 controls the light-emitting component 120 emitting the detecting light $L_{ID}$ by means of the light-emitting periodic signal $S_{LD}$ of the detecting frequency $F_C$, and the distance-measuring device 100 calculates the period length of the light going back and forth between the measured object $O_1$ and the distance-measuring device 100, by means of the light-sensing group 130 sensing the energy of the reflected light $L_{RD}$, so as to obtain the measured distance D. At the beginning of the "distance-calculating phase", the light-emitting/sensing controlling circuit 110 generates the reading signal $S_{RE}$ representing "reading" to reset the accumulated energy of the light-sensing group 130. Then, the light-emitting/sensing controlling circuit 110 generates the shutter periodic signals $S_{ST1}$ and $S_{ST2}$, and the light-emitting periodic signals $S_{LD}$ with the detecting frequency $F_C$ in the detecting cycles $T_{C1} \sim T_{CN}$. Therefore, in the detecting cycles $T_{C1} \sim T_{CN}$, the shutter periodic signals $S_{ST1}$ and $S_{ST2}$ repeat being switched between "turning-on" and "turning-off", and the light-emitting periodic signals $S_{LD}$ repeats being switched between "emitting" and "not-emitting". The period length of each detecting cycle $T_{C1} \sim T_{CN}$ is equal to a detecting cycle $T_C$, wherein the value of the detecting cycle $T_C$ is the inverse of the detecting frequency $F_C$. In the detecting cycles $T_{C1} \sim T_{CN}$, the phases of the light-emitting periodic signal $S_{LD}$ and the shutter periodic signal $S_{ST1}$ are approximately the same (in phase), and the phase of the shutter periodic signal $S_{ST1}$ is opposite to that of the shutter periodic signal $S_{ST2}$. More particularly, in the detecting cycles $T_{C1} \sim T_{CN}$, when the light-emitting periodic signal $S_{LD}$ represents "emitting", the shutter periodic signal $S_{ST1}$ represents "turning-on" and the shutter periodic signal $S_{ST2}$ represents "turning-off"; when the light-emitting periodic signal $S_{LD}$ represents "not-emitting", the shutter periodic signal $S_{ST1}$ represents "turning-off" and the shutter periodic signal $S_{ST2}$ represents "turning-on". In this way, in the first-half cycles of the detecting cycles $T_{C1} \sim T_{CN}$, the light-emitting component 120 emits the detecting light $L_{ID}$ and the light-sensing group 130 senses the energy of the reflected light $L_{RD}$ so as to accumulate the energy $E_{R1}$; and in the second-half cycles of the detecting cycles $T_{C1} \sim T_{CN}$, the light-sensing group 130 senses the energy of the reflected light $L_{RD}$ so as to accumulate the energy $E_{R2}$.

After the detecting cycles $T_{C1} \sim T_{CN}$, the light-emitting/sensing controlling circuit 110 simultaneously generates the reading signal $S_{RE}$ representing "reading" and the phase signal $S_P$ representing "distance-calculating", so that the light-sensing group 130 outputs the light-sensing signal $S_{LS1}$ to the distance-calculating circuit 140 according to the accumulated energy $E_{R1}$ and $E_{R1}$ and outputs the light-sensing signal $S_{LS2}$ to the distance-calculating circuit 140 according to the accumulated energy $E_{R2}$ and $E_{B2}$, wherein the accumulated energy $E_{R1}$ is generated by the light-sensing group 130 sensing the reflected light $L_{RD}$ in the first-half cycles of the detecting cycles $T_{C1} \sim T_{CN}$; the accumulated energy $E_{B1}$ is generated by the light-sensing group 130 sensing the background light $L_{RD}$ in the first-half cycles of the detecting cycles $T_{C1} \sim T_{CN}$; the accumulated energy $E_{B2}$ is generated by the light-sensing group 130 sensing the reflected light $L_{RD}$ in the second-half cycles of the detecting cycles $T_{C1} \sim T_{CN}$; and the accumulated energy $E_{B2}$ is generated by the light-sensing group 130 sensing the background light $L_B$ in the second-half cycles of the detecting cycles $T_{C1} \sim T_{CN}$. The distance-calculating circuit 140 calculates the measured distance D between the measured object $O_1$ and the distance-measuring device 100 according the frequency-detecting signal $S_{FQ}$, the light-sensing signals $S_{LS1}$ and $S_{LS2}$, and the background signal $S_B$, wherein the values of the light-sensing signals $S_{LS1}$ and $S_{LS2}$ are respectively equal to $(E_{R1}+E_{B1})$ and $(E_{R2}+E_{B2})$, and the value of the frequency-detecting signal $S_{FQ}$ is equal to the detecting frequency $F_C$. The operation principle of calculating measured distance D is illustrated as below.

It can be seen in FIG. 3 that a round-trip period $T_D$ after the light-emitting component 120 emitting the detecting light $L_{ID}$, the light-sensing group 130 starts to sense the reflected light $L_{RD}$ (that is, the reflected light $L_{RD}$ reaches the light-sensing group 130). In other words, the round-trip period $T_D$ is the sum of the period of the detecting light $L_{ID}$ flying from the light-emitting component 120 to the measured object $O_1$ and the period of the reflected light $L_{RD}$ flying from the measured object $O_1$ to the light-sensing group (that is, the time the light going back and forth between the measured object $O_1$ and the distance-measuring device 100). Since the period length of the light-sensing group 130 sensing the reflected light $L_{RD}$ to accumulate energy $E_{R1}$ in the first-half cycle of the detecting cycle $T_{C1}$ is $[(T_C/2)-T_D]$ and the pulse width of the detecting light $L_{ID}$ is equal to $(T_C/2)$, the period length of the light-sensing group 130 sensing the reflected light $L_{RD}$ to accumulate energy $E_{R2}$ in the second-half cycle of the detecting cycle $T_{C1}$ is equal to the period length of the pulse width of the detecting light $L_{ID}$ deducting the period of the light-sensing group 130 sensing the reflected light $L_{RD}$ to accumulate energy $E_{R1}$ in the first-half cycle of the detecting cycle $T_{C1}$. That is, the period length of the light-sensing group 130 sensing the reflected light $L_{RD}$ to accumulate energy $E_{R2}$ in the second-half cycle of the detecting cycle $T_{C1}$ is equal to that of the round-trip period $T_D$. In the detecting cycles $T_{C1} \sim T_{CN}$, since the light-emitting/sensing controlling circuit 110 generates the light-emitting periodic signal $S_{LD}$, and the shutter periodic signals $S_{ST1}$ and $S_{ST2}$ with the "fixed" detecting frequency $F_C$, the period length of the light-sensing group 130 sensing the reflected light $L_{RD}$ to accumulate the energy $E_{R1}$ in each first-half cycle is equal to $[(T_C/2)-T_D]$, and the period length of the light-sensing group 130 sensing the reflected light $L_{RD}$ to accumulate the energy $E_{R2}$ in each second-half cycle is equal to $T_D$. In this way, the ratio between the accumulated energy $E_{R1}$ and $E_{R2}$ is equal to $[(T_C/2)-T_D]/T_D$. As a result, the relation between the round-trip period $T_D$, the light-sensing signals $S_{LS1}$ and $S_{LS2}$, the detecting frequency $F_C$, and the background signal $S_B$ can be represented as the following formula:

$$T_D = (T_C/2) \times [E_{R2}/(E_{R1} + E_{R2})] \quad (2)$$
$$= [1/(2 \times F_C)] \times [(S_{LS2} - E_{B2})/(S_{LS1} - E_{B1} + S_{LS2} - E_{B2})]$$
$$= [1/(2 \times F_C)] \times [(S_{LS2} - E_{B2})/(S_{LS1} - E_{B1} + S_{LS2} - E_{B2})]$$
$$= [1/(2 \times F_C)] \times [(S_{LS2} - S_B/(2 \times F_C))/$$
$$(S_{LS1} + S_{LS2} - S_B/F_C)];$$

since the round-trip period $T_D$ is the time of the light going back and forth between the measured object $O_1$ and the distance-measuring device 100, the measured distance D can be represented as the following formula:

$$D = T_D \times C/2 \quad (3)$$
$$= [C/(4 \times F_C)] \times [(S_{LS2} - S_B/(2 \times F_C))/$$
$$(S_{LS1} + S_{LS2} - S_B/F_C)];$$

wherein C represents the light speed, N represents the number of the detecting cycles in the "distance-calculating phase".

In addition, it is noticeable, in the "distance-calculating phase", when N is equal to 1, it means the light-sensing group 130 senses the reflected light $L_{RD}$ in only one detecting cycle to accumulate the energy $E_{R1}$ and $E_{R2}$. However, if the reflectivity of the measured object $O_1$ is lower or the measured distance D is longer, the energy of the reflected light $L_{RD}$ becomes lower. In this way, the accumulated energy $E_{R1}$ and $E_{R2}$ of the light-sensing group 130 is so small that the measuring error may become too large to cause the distance-measuring device 100 obtains an incorrect measuring distance. When N becomes larger, the light-sensing group 130 senses the reflected light $L_{RD}$ in more detecting cycles to accumulate the energy $E_{R1}$ and $E_{R2}$, so that the energy $E_{R1}$ and $E_{R2}$ becomes larger. In this case, even if the reflectivity of the measured object $O_1$ is lower or the measured distance D is longer, the accumulated energy still can be raised up to be large enough by increasing the number of the detecting cycles, so that the measuring error can be reduced.

In addition, in the "distance-calculating phase", the measured distance D is calculated according to the round-trip period $T_D$ of the formula (2). However, if the measured distance D between the distance-measuring device 100 and the measured object $O_1$ is too long, it may causes the round-trip period $T_D$ is longer than a half of the detecting cycle $T_C$. That is, in the first-half cycle of the detecting cycle $T_{C1}$, the light-sensing group does not sense the reflected light $L_{RD}$ to accumulate the energy $E_{R1}$. In this way, the ratio between the accumulated energy $E_{R1}$ and $E_{R2}$ is not equal to $[(T_C/2)-T_D]/T_D$, so that the distance-calculating circuit 140 can not correctly calculate the measured distance D according to the formula (3). Consequently, the present invention provide a method ("frequency-adjusting phase") for the distance-measuring device 100 adjusting the detecting cycle $T_C$ (or the detecting frequency $F_C$) before the "distance-calculating phase", so as to assure that the round-trip period $T_D$ is shorter than a half of the detecting cycle $T_C$ and the distance-calculating circuit 140 can correctly calculate the measured distance D according to the formula (3).

Figure 4:
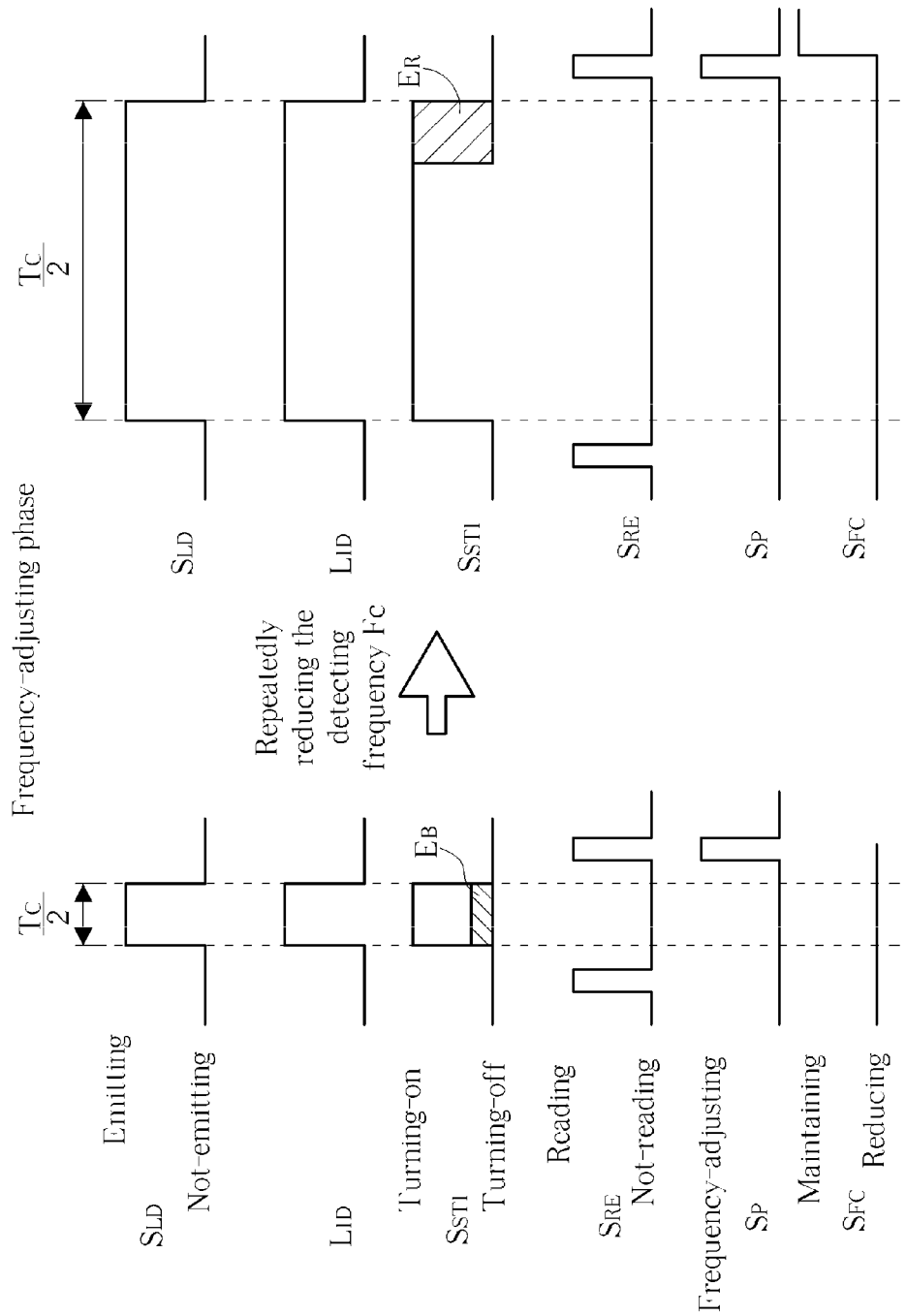
FIG. 4 is a waveform diagram of the control signals of the distance-measuring device in the "frequency-adjusting phase".

Please refer to FIG. 4. FIG. 4 is a waveform diagram of the control signals of the distance-measuring device 100 in the "frequency-adjusting phase". As shown in the left part of FIG. 4, when the distance-measuring device 100 enters the "frequency-adjusting phase", the light-emitting/sensing controlling circuit 110 generates the reading signal $S_{RE}$ representing "reading" so as to reset the accumulated energy of the light-sensing group 130. After that, the light-sensing/emitting controlling circuit 110 simultaneously generates the light-emitting periodic signal $S_{LD}$, which is representing "emitting" and having a pulse width $(T_C/2)$, and the shutter periodic signal $S_{ST1}$, which is representing "turning-on" and having a pulse width $(T_C/2)$. Finally, the light-emitting/sensing controlling circuit 110 generates the reading signal $S_{RE}$ representing "reading" and the phase signal $S_P$ representing "frequency-adjusting", so that the light-sensing group 130 outputs the light-sensing signal $S_{LS1}$ according to the energy $E_R$ accumulated by the light-sensing group 130 sensing the reflected light $L_{RD}$ and the energy $E_B$ accumulated by light-sensing group 130 sensing the background light $L_B$ (more particularly, $S_{LS1}=E_B+E_R$). The frequency-adjusting circuit 160 outputs the frequency-controlling signal $S_{FC}$ according to the light-sensing signal $S_{LS1}$ and the background signal $S_B$. It can be seen in FIG. 4 that when the round-trip period $T_D$ of the light going back and forth between the distance-measuring device 100 and the measured object $O_1$ is shorter than $(T_C/2)$, it means that the reflected light $L_{RD}$ can reach the light-sensing group 130 before the end of the period of the shutter periodic signal $S_{ST1}$ representing "turning-on". Therefore, the light-sensing group 130 can sense the reflected light $L_{RD}$ so as to accumulate the energy $E_R$. When the round-trip period $T_D$ is longer than $(T_C/2)$, it means that the reflected light $L_{RD}$ can not reach the light-sensing group 130 in time. Thus, the light-sensing group 130 can not sense the reflected light $L_{RD}$ and can not accumulate the energy $E_R$. In addition, the energy $E_R$ can be represented as the following formula:

$$E_R = S_{LS1} - S_B/(2 \times F_C) \quad (4);$$

hence, when the frequency-adjusting circuit 160 determines that the accumulated energy $E_R$ is smaller or equal to a predetermined threshold energy $E_{TH}$ (for example, $E_{TH}$ is zero)

according to formula (4), it means the round-trip period $T_D$ is longer than ($T_C/2$) and the reflected light $L_{RD}$ can not reach the light-sensing group 130 in time. Meanwhile, the frequency-adjusting circuit 160 outputs the frequency-controlling signal $S_{FC}$ representing "reducing" so as to control the light-emitting/sensing controlling circuit 110 reducing the detecting frequency $F_C$ (that is, increasing the detecting cycle $T_C$). After the light-emitting/sensing controlling circuit 110 reduces the detecting frequency $F_C$, The light-emitting/sensing controlling circuit 110 repeats the above-mentioned process again to determine if the round-trip period $T_D$ is shorter than ($T_C/2$) (that is, the reflected light $L_{RD}$ can reach the light-sensing group 130 in time). When the frequency-adjusting circuit 160 determines the accumulated energy $E_R$ is larger than the predetermined threshold energy $E_{TH}$, it represents that the round-trip period $T_D$ is shorter than ($T_C/2$). Meanwhile, the frequency 160 outputs the frequency-controlling signal $F_C$ representing "maintaining" so as to control the light-emitting/sensing controlling circuit 110 keeping the detecting frequency $F_C$ unchanged and finish the "frequency-adjusting phase". In this way, the device-measuring device 100 assures the round-trip period $T_D$ is shorter than ($T_C/2$) (that is, the reflected light $L_{RD}$ can reach the light-sensing group 130 in time) by means of the frequency-adjusting circuit 160 adjusting the detecting frequency $F_C$ in the "frequency-adjusting phase".

In conclusion, In the "background-measuring phase", the light-sensing group 130 senses the background light $L_B$, so that the distance-measuring device 100 can calculates the energy accumulated by the light-sensing group 130 sensing the background light $L_B$ per unit time; In the "frequency-adjusting phase", the distance-measuring device 100 reduces the detecting frequency $F_C$ until the round-trip period $T_D$ is shorter than ($T_C/2$) (that is, the reflected light $L_{RD}$ can reach the light-sensing group 130 in time); in the "distance-calculating phase" the distance-measuring device 100 calculates the measured distance D, by means of the formula (3), according to the background signal $S_B$, the frequency-detecting signal $S_{FQ}$, and the light-sensing signals $S_{LS1}$ and $S_{LS2}$, which are outputted by the light-sensing group 130 sensing the reflected light in detecting cycles $T_{C1} \sim T_{CN}$. The distance-measuring device 100 calibrates the ratio between the light-sensing signals $S_{LS1}$ and $S_{LS2}$ according to the background signal $S_B$. In this way, the distance-measuring device 100 reduces the effect of the background light $L_B$ and the measuring error when the measured distance D is too long or when the reflectivity of the measured object $O_1$ is too low, so that the distance-measuring device 100 can more correctly calculate the measured distance D.

Figure 5:
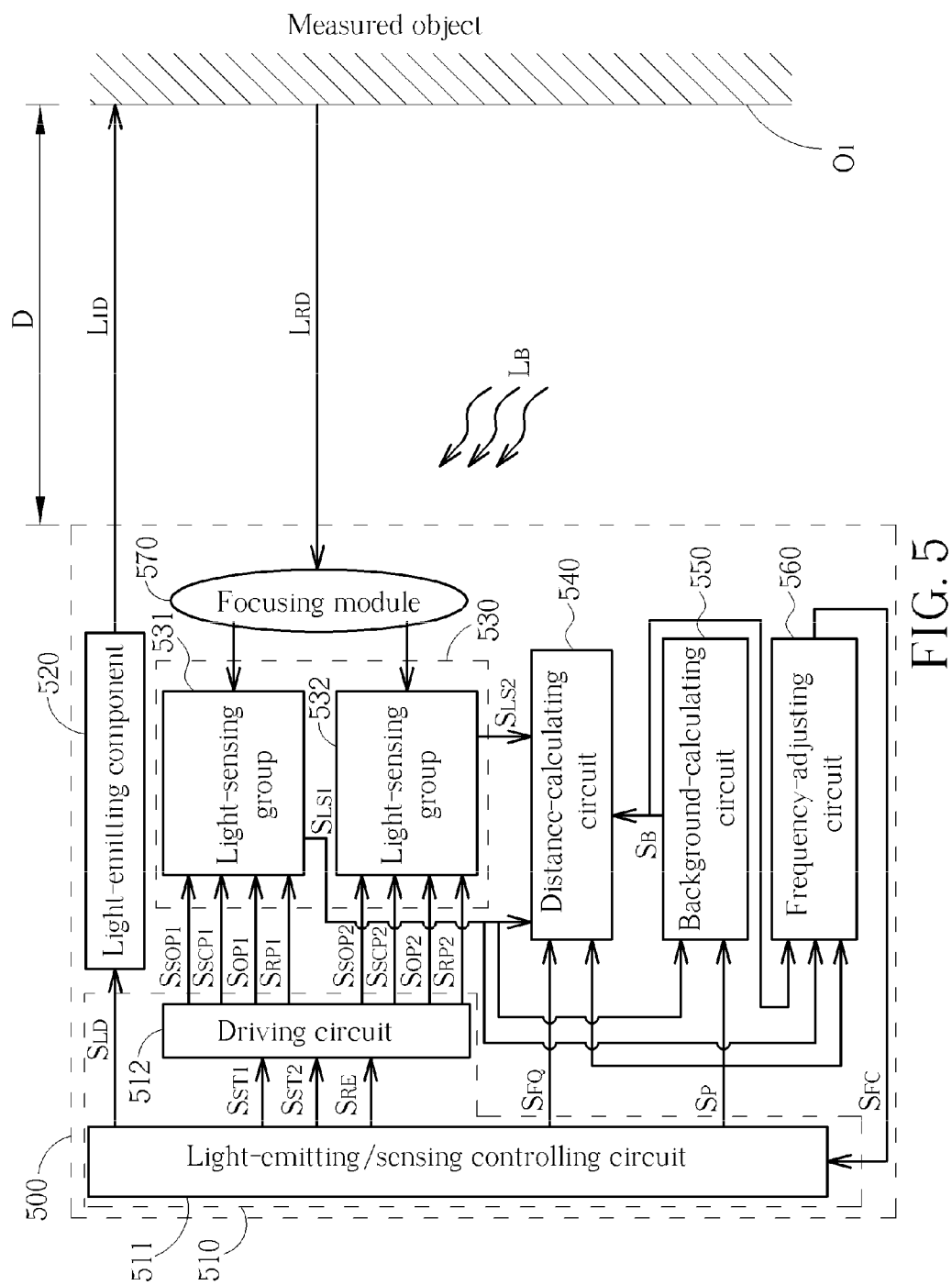
FIG. 5 is a diagram illustrating a distance-measuring device according to a second embodiment of the present invention.

Please refer to FIG. 5. FIG. 5 is a diagram illustrating a distance-measuring device 500 according to a second embodiment of the present invention. The structure and the operation principle of the light-emitting/sensing controlling circuit 511, the light-emitting component 520, the distance-calculating circuit 540, the background-calculating circuit 550, the frequency-adjusting circuit 560, and the focusing module 570 are respectively similar to those of the light-emitting/sensing controlling circuit 110, the light-emitting component 120, the distance-calculating circuit 140, the background-calculating circuit 150, the frequency-adjusting circuit 160, and the focusing module 170, and will not be repeated again for brevity. Compared with the distance-measuring device 100, the distance-measuring device 500 comprises a light-emitting/sensing module 510. The light-emitting/sensing module 510 includes the light-emitting/sensing controlling circuit 511, and a driving circuit 512. The driving circuit 512 generates shutter-on pulse signals $S_{SOP1}$ and $S_{SOP2}$, shutter-off pulse signals $S_{SCP1}$ and $S_{SCP2}$, reset pulse signals $S_{RP1}$ and $S_{RP2}$, and output pulse signals $S_{OP1}$ and $S_{OP2}$ according to the shutter periodic signals $S_{ST1}$ and $S_{ST2}$, and the reading signal $S_{RE}$. The light-sensing group 530 comprises light-sensing components 531 and 532. The light-sensing component 531 senses the background light $L_B$ or the reflected light $L_{RD}$ to accumulate the energy according to the shutter-on pulse signal $S_{SOP1}$, and the shutter-off pulse signal $S_{SCP1}$; the light-sensing component 531 outputs the light-sensing signal $S_{LS1}$ according to the output pulse signal $S_{OP1}$ and the accumulated energy; and the light-sensing component 531 resets the accumulated energy according to the reset pulse signal $S_{RP1}$. Similarly, the light-sensing component 532 senses the background light $L_B$ or the reflected light $L_{RD}$ to accumulate the energy according to the shutter-on pulse signal $S_{SOP2}$, and the shutter-off pulse signal $S_{SCP2}$; the light-sensing component 532 outputs the light-sensing signal $S_{LS2}$ according to the output pulse signal $S_{OP2}$ and the accumulated energy; and the light-sensing component 532 resets the accumulated energy according to the reset pulse signal $S_{RP2}$.

Figure 6:
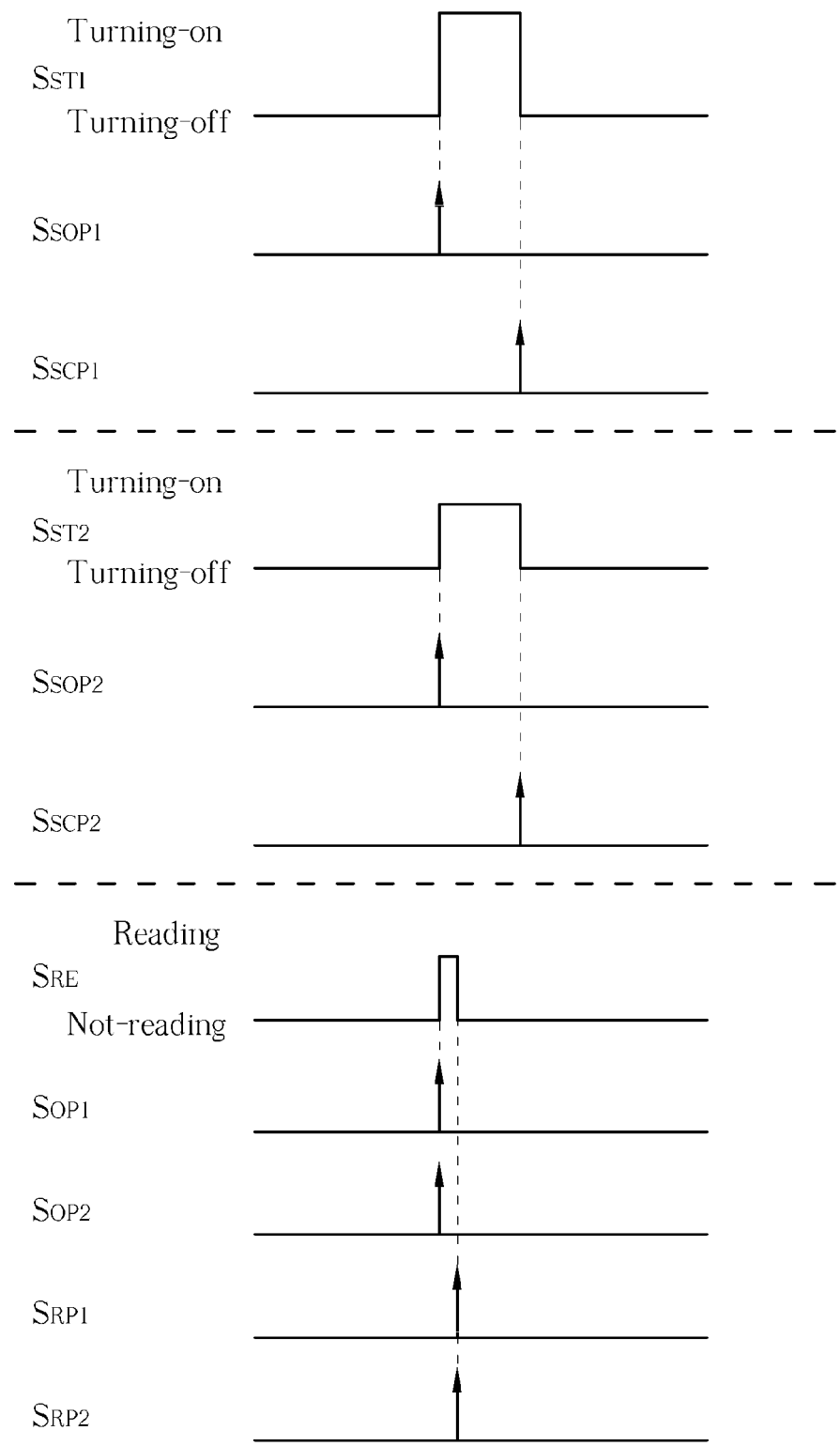
FIG. 6 is a diagram illustrating the driving circuit generating the control signals, according to the shutter periodic signals and the reading signal.

Please refer to FIG. 6. FIG. 6 is a diagram illustrating the driving circuit 512 generating the shutter-on pulse signals $S_{SOP1}$ and $S_{SOP2}$, the shutter-off pulse signals $S_{SCP1}$ and $S_{SCP2}$, the reset pulse signals $S_{RP1}$ and $S_{RP2}$, and the output pulse signals $S_{OP1}$ and $S_{OP2}$ according the shutter periodic signals $S_{ST1}$ and $S_{ST2}$, and the reading signal $S_{RE}$. As shown in FIG. 6, when the shutter periodic signal $S_{ST1}$ changes from "turning-off" to "turning-on", the driving circuit 512 generates the shutter-on pulse signal $S_{SOP1}$; when the shutter periodic signal $S_{ST1}$ changes from "turning-on" to "turning-off", the driving circuit 512 generates the shutter-off pulse signal $S_{SCP1}$. When the shutter periodic signal $S_{ST2}$ changes from "turning-off" to "turning-on", the driving circuit 512 generates the shutter-on pulse signal $S_{SOP2}$; when the shutter periodic signal $S_{ST2}$ changes from "turning-on" to "turning-off", the driving circuit 512 generates the shutter-off pulse signal $S_{SCP2}$. When the reading signal $S_{RE}$ represents "reading", the driving circuit 512 generates the output pulse signals $S_{OP1}$ and $S_{OP2}$, and then generates the reset pulse signals $S_{RP1}$ and $S_{RP2}$.

Figure 7:
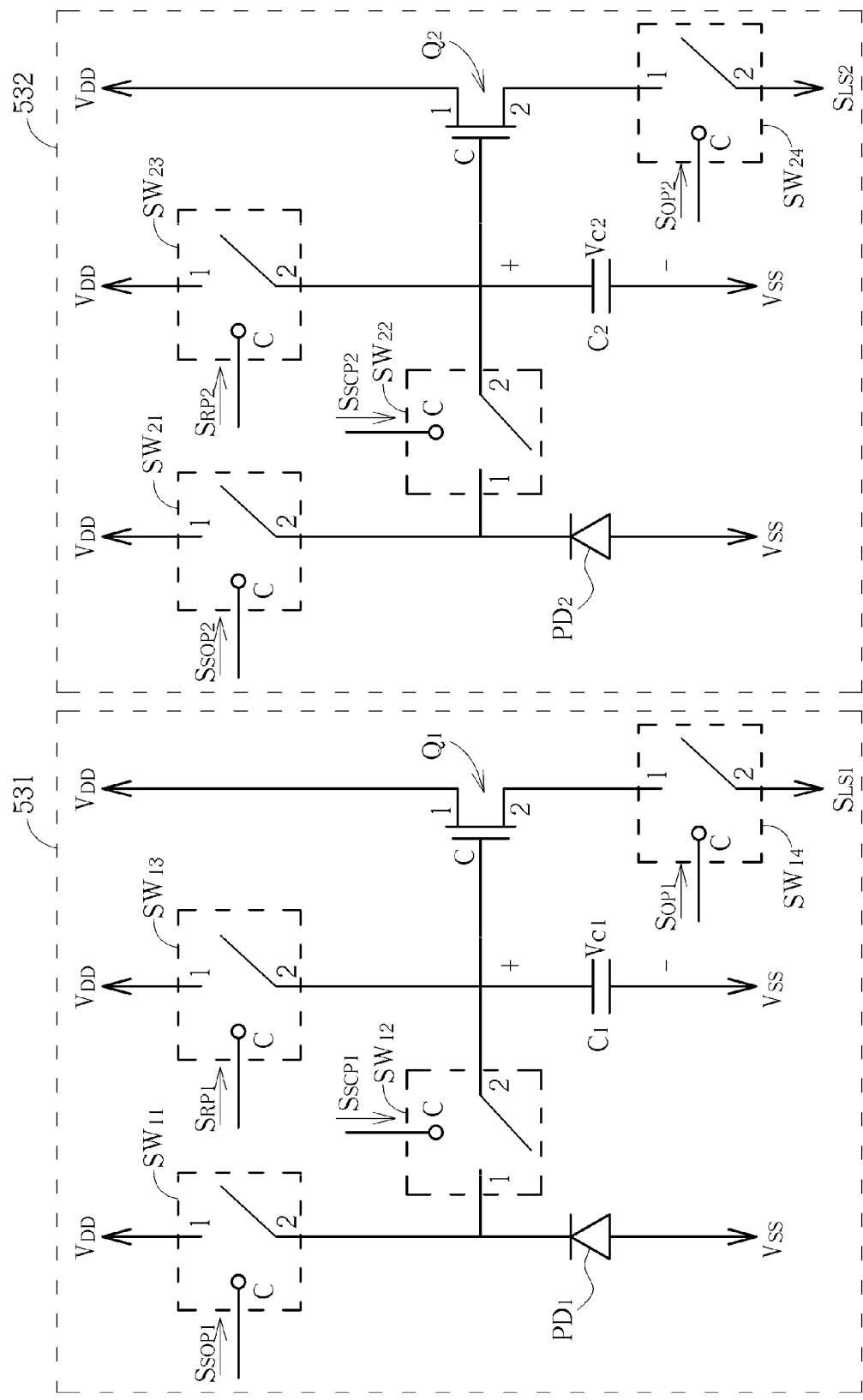
FIG. 7 is a diagram illustrating the structure of the light-sensing group according to an embodiment of the present invention.

Please refer to FIG. 7. FIG. 7 is a diagram illustrating the structure of the light-sensing group 530 according to an embodiment of the present invention. The structure of the light-sensing group 530 is similar to that of the CMOS light sensor of the digital camera. The light-sensing component 531 comprises switches $SW_{11}$, $SW_{12}$, $SW_{13}$ and $SW_{14}$, a photo diode $PD_1$, a capacitor $C_1$, and a transistor $Q_1$. When the control end C of the switch $SW_{13}$ receives the reset pulse signal $S_{RP1}$, the first end 1 of the switch $SW_{13}$ is couple to the second end 2 of the switch $SW_{13}$ (which means the switch $SW_{13}$ is turned on), so that the capacitor $C_1$ is couple to the voltage source $V_{DD}$ through the turned-on switch $SW_{13}$ to reset the voltage $V_{C1}$ to be at a predetermined voltage level (for instance, $V_{DD}$). The photo diode $PD_1$ is utilized for generating and accumulating electrons of a quantity $N_{E1}$ according to the energy of the reflected light $L_{RD}$. When the control end C of the switch $SW_{12}$ receives the shutter-off pulse signal $S_{SCP1}$, the first end 1 of the switch $SW_{12}$ is couple to the second end 2 of the switch $SW_{12}$ (which means the switch $SW_{12}$ is turned on), so that the accumulated electrons of the photo diode $PD_1$ flows to the capacitor $C_1$, reducing the voltage $V_{C1}$. The switch $SW_{11}$ is utilized for eliminating the residual electrons of the photo diode $PD_1$ according to the shutter-on pulse signal $S_{SOP1}$ so as to reset the electron quantity $N_{E1}$. More particularly, when the control end C of the switch $SW_{11}$ receives the shutter-on pulse signal $S_{SOP1}$, the first end 1 of the switch $SW_{11}$ is coupled to the second end 2 of the switch $SW_{11}$, so that the photo diode $PD_1$ is coupled to the voltage source $V_{DD}$ through the turned-on switch $SW_{11}$ and the accumulated electrons of the photo diode $PD_1$ flow to the voltage source $V_{DD}$ through the turned-on switch $SW_{11}$. The transistor $Q_1$ is utilized as a voltage follower. As a result, the voltage on the second end 2 of the transistor $Q_1$ varies with the voltage ($V_{C1}$) on the control end (gate) C of the transistor $Q_1$. When the control end C of the switch $SW_{14}$ receives the output pulse signal $S_{OP1}$, the first end 1 and the second 2 of the switch $SW_{14}$ are coupled together. Therefore, the switch $SW_{14}$ outputs the light-sensing signal $S_{LS1}$ according to the voltage $V_{C1}$ by means of the transistor $Q_1$ (voltage follower). In this way, the voltage $V_{C1}$ can be obtained according to the light-sensing signal $S_{LS1}$, and the accumulated energy of the light-sensing component 531 can be calculated according to the voltage difference between voltage level of the voltage $V_{C1}$ and the predetermined voltage level (for example, $V_{DD}$).

The light-sensing component 532 comprises switches $SW_{21}, SW_{22}, SW_{23}$ and $SW_{24}$, a photo diode $PD_2$, a capacitor $C_2$, and a transistor $Q_2$. The structure and the operation principle of the light-sensing component 532 are similar to those of the light-sensing component 531, and are omitted for brevity.

When the light-emitting/sensing controlling circuit 511 generates the shutter periodic signals $S_{ST1}$ or $S_{ST2}$, or the reading signal $S_{RE}$, the driving circuit 512 accordingly generates the corresponding control signals (the shutter-on pulse signals $S_{SOP1}$ and $S_{SOP2}$, shutter-off pulse signals $S_{SCP1}$ and $S_{SCP2}$, reset pulse signals $S_{RP1}$ and $S_{RP2}$, and output pulse signals $S_{OP1}$ and $S_{OP2}$) to control the light-sensing components 531 and 532 of the light-sensing group 530. More particularly, when the shutter periodic signal $S_{ST1}$ represents "turning-on", the light-sensing component 531 senses the energy of the reflected light $L_{RD}$; when the shutter periodic signal $S_{ST2}$ represents "turning-on", the light-sensing component 532 senses the energy of the reflected light $L_{RD}$. When the reading signal $S_{RE}$ represents "reading", the light-sensing component 531 outputs the light-sensing signal $S_{LS1}$ and resets the accumulated energy of the light-sensing component 531 at the same time, and the light-sensing component 532 outputs the light-sensing signal $S_{LS2}$ and resets the accumulated energy of the light-sensing component 532 at the same time. In other words, by means of the driving circuit 512, the light-sensing group 530 can operate as the light-sensing group 130 and the distance-measuring device 500 can operate as the distance-measuring device 100 as well. Consequently, the distance-measuring 500 can correctly measure the measured distance D by means of the methods of the "background-measuring phase", the "frequency-adjusting phase", and the "distance-calculating phase" mentioned in FIG. 2~FIG. 4.

Figure 8:
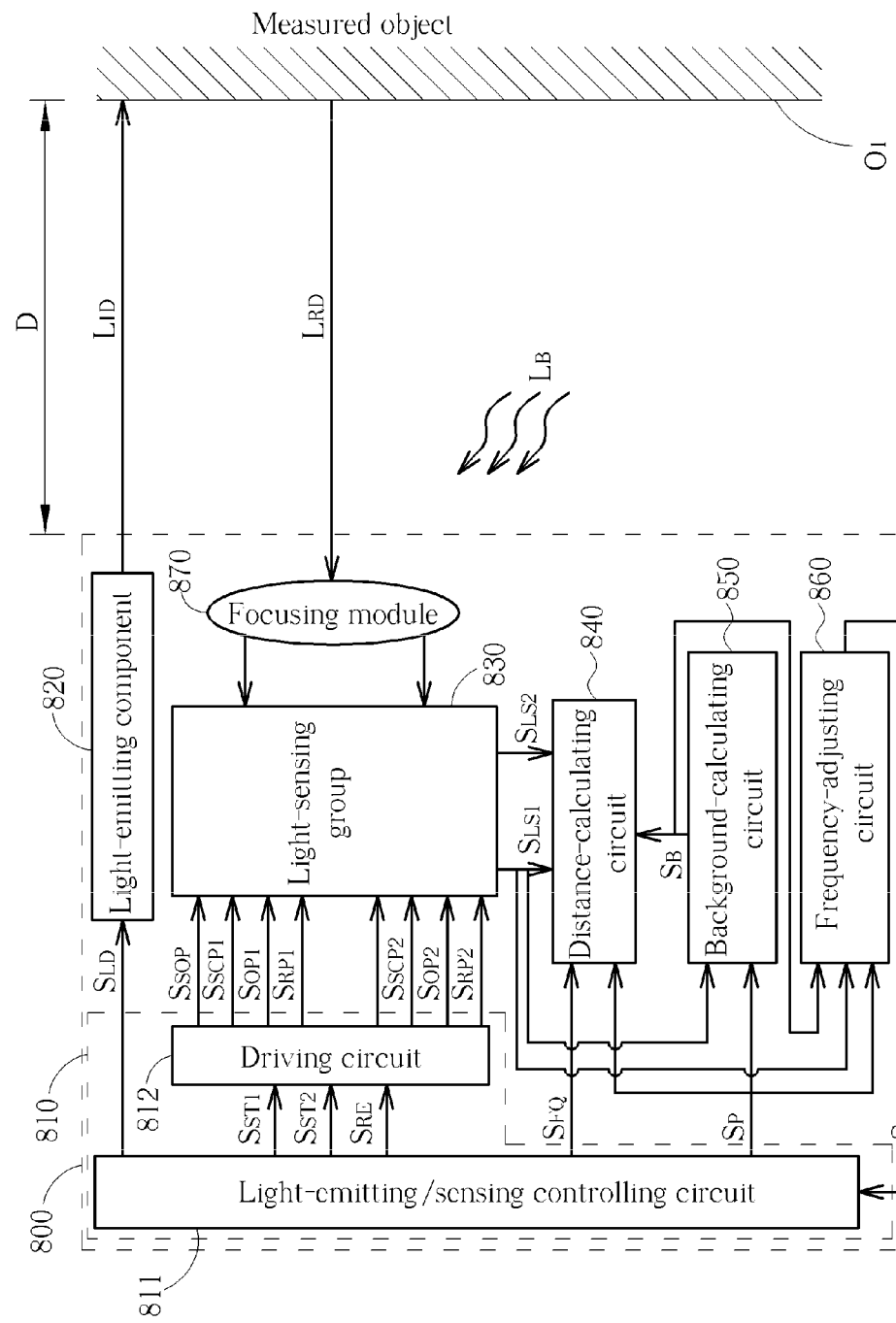
FIG. 8 is a diagram illustrating a distance-measuring device according to a third embodiment of the present invention.

Please refer to FIG. 8. FIG. 8 is a diagram illustrating a distance-measuring device 800 according to a third embodiment of the present invention. The structure and the operation principle of the light-emitting/sensing controlling circuit 811, the light-emitting component 820, the distance-calculating circuit 840, the background-calculating circuit 850, the frequency-adjusting circuit 860, and the focusing module 870 are respectively similar to those of the light-emitting/sensing controlling circuit 110, the light-emitting component 120, the distance-calculating circuit 140, the background-calculating circuit 150, the frequency-adjusting circuit 160, and the focusing module 170, and will not be repeated again for brevity. The light-emitting/sensing module 810 comprises the light-emitting/sensing controlling circuit 811, and a driving circuit 812. The driving circuit 812 generates the shutter-on pulse signal $S_{SOP}$, the shutter-off pulse signals $S_{SCP1}$ and $S_{SCP2}$, the reset pulse signals $S_{RP1}$ and $S_{RP2}$, and the output pulse signals $S_{OP1}$ and $S_{OP2}$ according to the shutter periodic signals $S_{ST1}$ and $S_{ST2}$, and the reading signal $S_{RE}$. The operation principle of the driving circuit 812 is similar to that of the driving circuit 512. The difference between the driving circuits 512 and 812 is that no matter when the shutter periodic signal $S_{ST1}$ or the shutter periodic signal $S_{ST2}$ changes from "turning-off" to "turning-on", the driving circuit 812 triggers the shutter-on pulse signal $S_{SOP}$.

Figure 9:
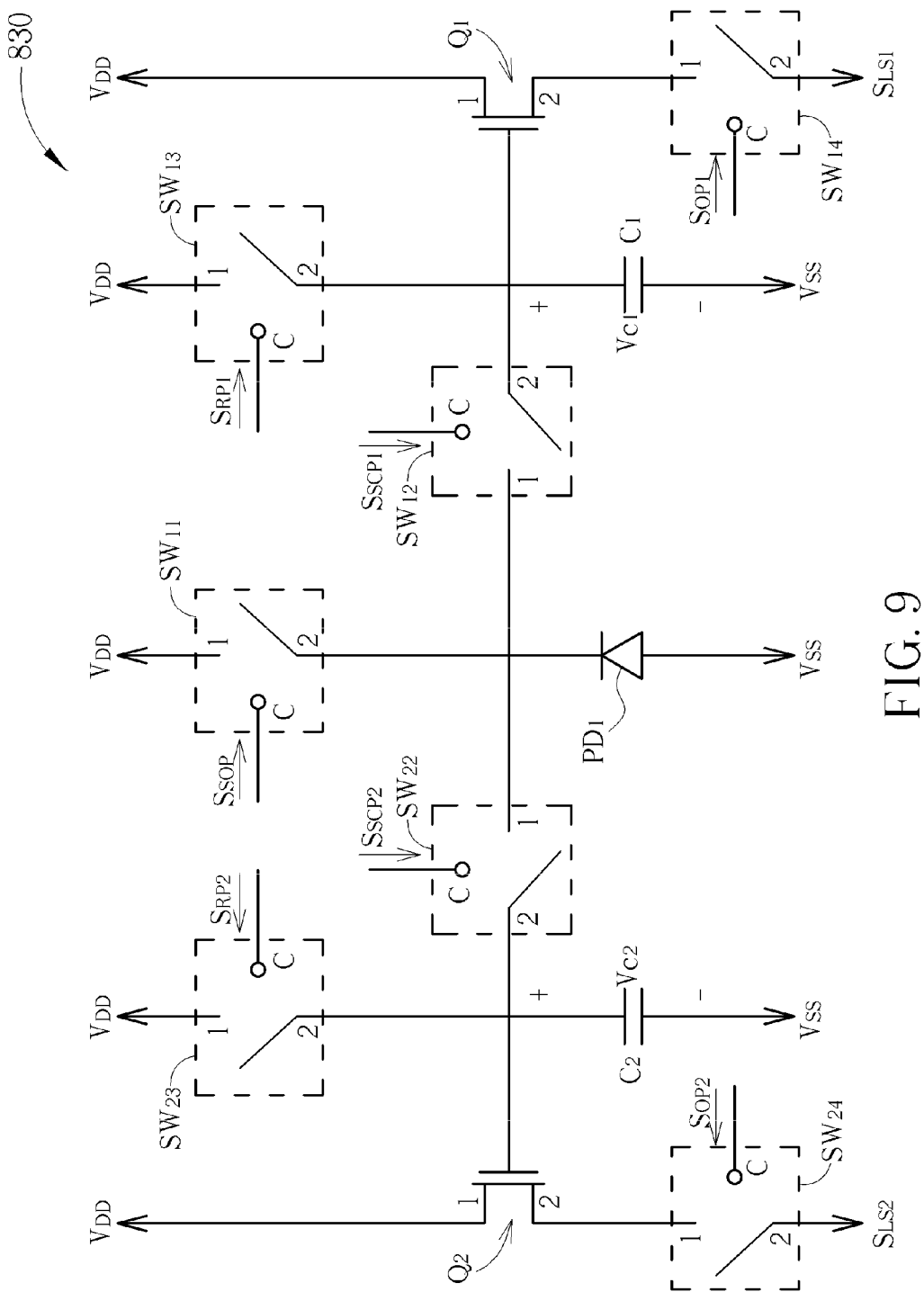
FIG. 9 is a diagram illustrating the structure of the light-sensing group according to an embodiment of the present invention.

Please refer to FIG. 9. FIG. 9 is a diagram illustrating the structure of the light-sensing group 830 according to an embodiment of the present invention. The structure and the operation principle of the light-sensing group 830 are similar to those of the light-sensing group 530. Compared with the light-sensing group 530, the light-sensing group 830 does not have the switch $SW_{21}$ and the photo diode $PD_2$. Since in the "background-measuring phase" or in the "frequency-adjusting phase", the distance-measuring device 500 uses only the light-sensing component 531 of the light-sensing group 530, it means that in the "background-measuring phase" or in the "frequency-adjusting phase", the distance-measuring device 500 does not need the switch $SW_{21}$ and the photo diode $PD_2$. Therefore, n the "background-measuring phase" or in the "frequency-adjusting phase", the distance-measuring device 800 can operate as the distance-measuring device 500 by means of the light-sensing group 830. In addition, since in the detecting cycles $T_{C1}~T_{CN}$ of the "distance-calculating phase", when the shutter periodic signal $S_{ST1}$ represents "turning-on", the shutter periodic signal $S_{ST2}$ represents "turning-off"; when the shutter periodic signal $S_{ST1}$ represents "turning-off", the shutter periodic signal $S_{ST2}$ represents "turning-on". That is, the shutter periodic signals $S_{ST1}$ and $S_{ST2}$ do not represent "turning-on" at the same time. Thus, in the first-half cycles of the detecting cycles $T_{C1}~T_{CN}$ (the shutter periodic signal $S_{ST1}$ represents "turning-on"), the distance-measuring device 800 can use the photo diode $PD_1$ of the light-sensing group 830 to accumulate electrons. When the shutter periodic signal $S_{ST1}$ changes from "turning-on" to "turning-off", the accumulated electrons of the photo diode $PD_1$ flows to the capacitor $C_1$ so as to change the voltage level of the voltage $V_{C1}$. In the second-half cycles of the detecting cycles $T_{C1}~T_{CN}$ (the shutter periodic signal $S_{ST2}$ represents "turning-on"), the distance-measuring device 800 can use the photo diode $PD_1$ of the light-sensing group 830 to accumulate electrons as well. When the shutter periodic signal $S_{ST2}$ changes from "turning-on" to "turning-off", the accumulated electrons of the photo diode $PD_1$ flows to the capacitor $C_2$ so as to change the voltage level of the voltage $V_{C2}$. That is, although the light-sensing group 830 has only one photo diode $PD_1$, the light-sensing group 830 still can operate as the light-sensing group 530 in the "distance-calculating phase". In other words, the distance-measuring device 800 can operate as the distance-measuring device 500 in the "distance-calculating phase". In this way, since the distance-measuring device 800 can operate as the distance-measuring device 500 in the "background-measuring phase", the "frequency-adjusting phase", and the "distance-calculating phase", the distance-measuring device 800 also can correctly measure the measured distance D by means of the methods of the "background-measuring phase", the "frequency-adjusting phase", and the "distance-calculating phase" mentioned in FIG. 2~FIG. 4.

In addition, in the light-sensing group 530, the area occupied by the photo diode $PD_2$ is large. Hence, compared with the light-sensing group 530, the area occupied by the light-sensing group 830 is smaller, so that the cost of the light-sensing group 830 is lower.

Figure 10:
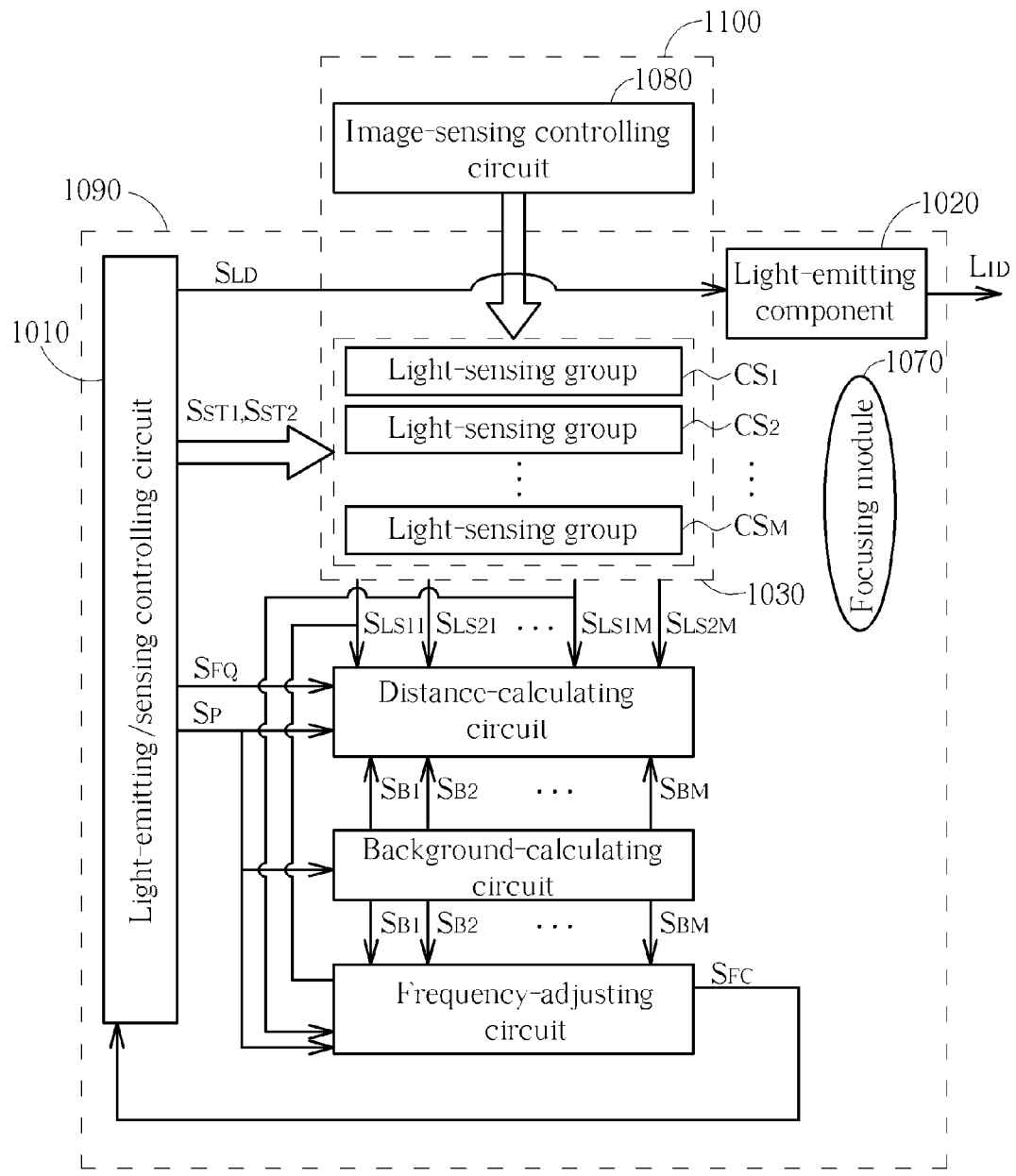
FIG. 10 and FIG. 11 are diagrams illustrating a 3D image-sensing device of the present invention.
Figure 11:
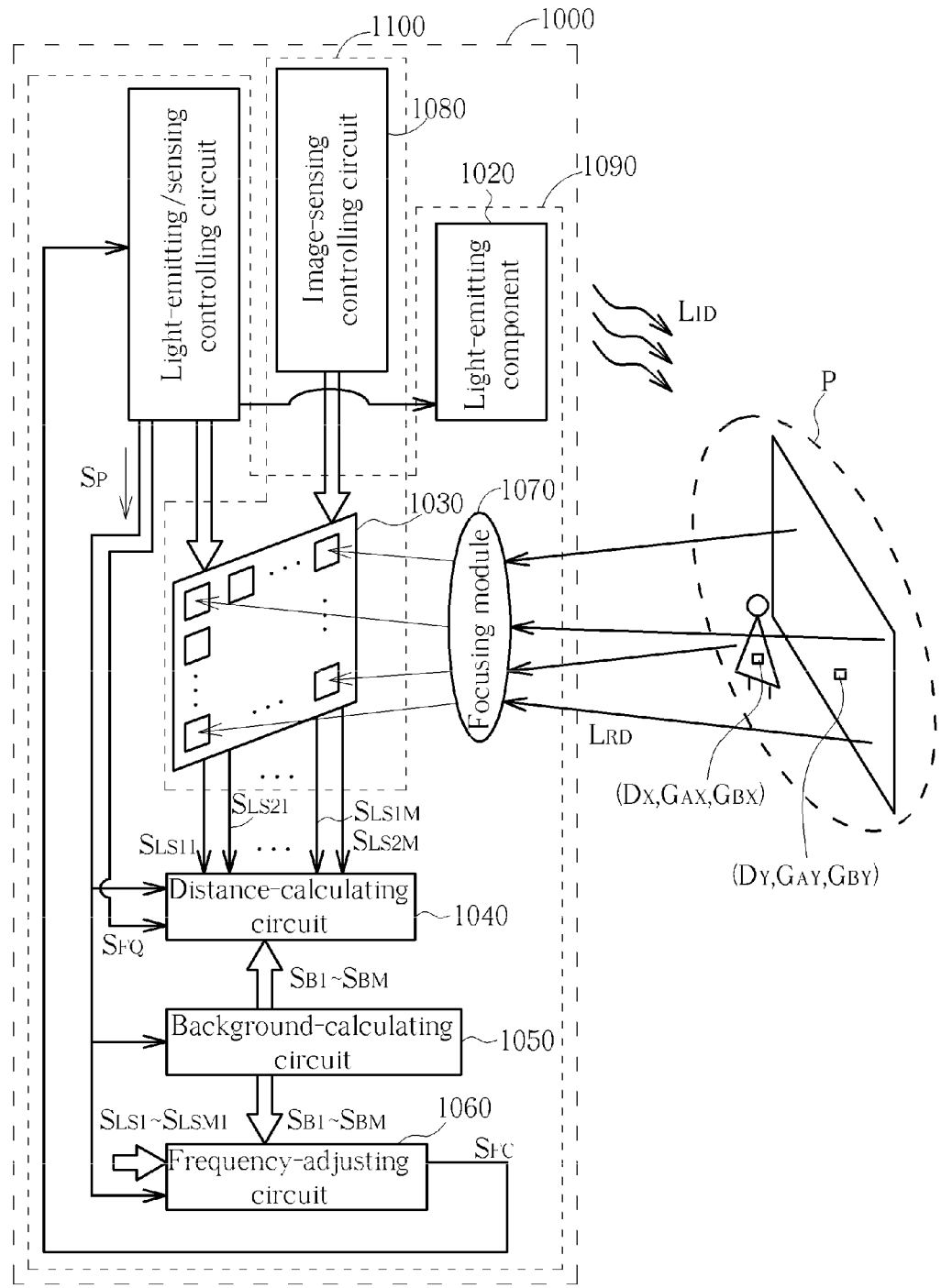

Please refer to FIG. 10 and FIG. 11. FIG. 10 and FIG. 11 are diagrams illustrating a 3D image-sensing device 1000 of the present invention. The 3D image-sensing device 1000 comprises a distance-measuring device 1090 and a 2D image-sensing device 1100. The distance-measuring device 1090 comprises a light-emitting/sensing controlling circuit 1010, a light-emitting component 1020, a light-sensing module 1030, a distance-calculating circuit 1040, a background-calculating circuit 1050, a frequency-adjusting circuit 1060, and a focusing module 1070. The 2D image-sensing device 1100 comprises an image-sensing controlling circuit 1080, and the light-sensing module 1030, wherein the light-sensing module 1030 is shared by the 2D image-sensing device 1100 and the distance-measuring device 1090. The operation principle and the structure of the light-emitting/sensing controlling circuit 1010, the light-emitting component 1020, the distance-calculating circuit 1040, the background-calculating circuit 1050, the frequency-adjusting circuit 1060 are respectively similar to those of the light-emitting/sensing controlling circuit 110 (or the light-emitting/sensing controlling circuit 511), the light-emitting component 120 (or the light-emitting component 520 or 820), the distance-calculating circuit 140 (or the distance-calculating circuit 540 or 840), the background-calculating circuit 150 (or the background-calculating circuit 550 or 850), the frequency-adjusting circuit 160 (or the frequency-adjusting circuit 560 or 860). Compared with the distance-measuring devices 130, 500, and 800, the light-sensing module 1030 of the 3D image-sensing device 1000 comprises light-sensing groups $CS_1 \sim CS_M$, wherein M represents a positive integer. The operation principle and the structure of the light-sensing groups $CS_1 \sim CS_M$ are similar to those of the light-sensing group 130 or 530. In addition, the light-sensing groups $CS_1 \sim CS_M$ are controlled by the image-sensing controlling circuit 1080 for sensing a scene P (as shown in FIG. 11) so as to obtain a 2D image SIM. The scene P comprises reflecting points $PN_1 \sim PN_M$. The 2D image SIM comprises M pixels, and each pixel comprises two sub-pixels. The reflecting points $PN_1 \sim PN_M$ of the scene P are respectively correspond to the M pixels of the 2D image SIM.

The 3D image-sensing device 1000 can use the image-sensing controlling circuit 1080 to control the light-sensing module 1030 sensing each reflecting point of the scene P so as to obtain the sub-pixel image data of the M pixels corresponding to reflecting points $PN_1 \sim PN_M$. In addition, the 3D image-sensing device 1000 also can use the distance-measuring module 1090 to measure the distance between each reflecting point of the scene P and the 3D image-sensing device 1000. In other words, the 3D image-sensing device 1000 can obtain the 2D image SIM corresponding to the reflecting points $PN_1 \sim PN_M$ and the distance data corresponding to the measured distances $D_1 \sim D_M$ between the reflecting points $PN_1 \sim PN_M$ and the 3D image-sensing device 1000.

For example, the structures of the light-sensing groups $CS_1 \sim CS_M$ are similar to that of the light-sensing group 530. That is, each of the light-sensing groups $CS_1 \sim CS_M$ comprises two light-sensing components. The light-sensing group $CS_1$ comprises light-sensing components $CSA_1$ and $CSB_1$; the light-sensing group $CS_2$ comprises light-sensing components $CSA_2$ and $CSB_2$; and the light-sensing group $CS_M$ comprises light-sensing components $CSA_M$ and $CSB_M$ and so on. As a result, the 3D image-sensing device 1000 generates the shutter periodic signals $S_{ST1}$ and $S_{ST2}$, and the reading signal $S_{RE}$ by means of the light-emitting/sensing controlling circuit 1010 of the distance-measuring device 1090 to control the light-sensing groups $CS_1 \sim CS_M$. For example, the light-sensing group CSK comprises light-sensing components $CSA_K$ and $CSB_K$. When the shutter periodic signal $S_{ST1}$ represents "turning-on", the light-sensing component $CSA_K$ senses the energy of the reflected light $L_{RD}$, which is generated by the reflecting point $PN_K$ of the scene P reflecting the detecting light $L_{ID}$, so as to accordingly accumulate the energy $E_{R1K}$; when the shutter periodic signal $S_{ST1}$ represents "turning-off", the light-sensing component $CSA_K$ does not sense the energy of the reflected light $L_{RD}$ generated by the reflecting point $PN_K$ of the scene P reflecting the detecting light $L_{ID}$, and does not accumulate the energy $E_{R1K}$. When the reading signal $S_{RE}$ represents "reading", the light-sensing component $CSA_K$ outputs the light-sensing signal $S_{LS1K}$ according to the accumulated energy $E_{R1K}$. When the shutter periodic signal $S_{ST2}$ represents "turning-on", the light-sensing component $CSB_K$ senses the energy of the reflected light $L_{RD}$ generated by the reflecting point $PN_K$ of the scene P reflecting the detecting light $L_{ID}$, so as to accordingly accumulate the energy $E_{R2K}$; when the shutter periodic signal $S_{ST2}$ represents "turning-off", the light-sensing component $CSB_K$ does not sense the energy of the reflected light $L_{RD}$ generated by the reflecting point $PN_K$ of the scene P reflecting the detecting light $L_{ID}$, and does not accumulate the energy $E_{R2K}$. When the reading signal $S_{RE}$ represents "reading", the light-sensing component $CSB_K$ outputs the light-sensing signal $S_{LS2K}$ according to the accumulated energy $E_{R2K}$. In addition, when the reading signal $S_{RE}$ represents "reading", the light-sensing components $CSA_K$ and $CSB_K$ reset the accumulated energy $E_{R1K}$ and $E_{R2K}$ after the light-sensing components $CSA_K$ and $CSB_K$ output the light-sensing signals $S_{LS1K}$ and $S_{LS2K}$.

In this way, the light-emitting/sensing controlling circuit 1010 respectively controls the light-sensing groups $CS_1 \sim CS_M$ measuring the measured distances $D_1 \sim D_M$ between the reflecting points $PN_1 \sim PN_M$ of the scene P and the 3D image-sensing device 1000, by means of the methods of the "background-measuring phase" mentioned in FIG. 2, the "frequency-adjusting phase" mentioned in FIG. 4, and the "distance-calculating phase" mentioned in FIG. 3.

On the other hand, the 3D-image sensing device 1000 uses the image-sensing controlling circuit 1080 to control the light-sensing module 1030 sensing the reflecting points $PN_1 \sim PN_M$ of the scene P to obtain the 2D image SIM, wherein the 2D image SIM comprises the sub-pixel image data $G_{A1} \sim G_{AM}$ and $G_{B1} \sim G_{BM}$. More particularly, the image-sensing controlling circuit 1080 respectively controls the light-sensing components $CSA_1$ and $CSB_1$ sensing the reflecting point $PN_1$ of the scene P so as to obtain the two sub-pixel image data $G_{A1}$ and $G_{B1}$, the image-sensing controlling circuit 1080 respectively controls the light-sensing components $CSA_X$ and $CSB_X$ sensing the reflecting point $PN_X$ of the scene P so as to obtain the two sub-pixel image data $G_{AX}$ and $G_{BX}$, wherein the distance between the reflecting point $PN_X$ and the 3D image-sensing device 1000 is $D_X$; the image-sensing controlling circuit 1080 respectively controls the light-sensing components $CSA_Y$ and $CSB_Y$ sensing the reflecting point $PN_Y$ of the scene P so as to obtain the two sub-pixel image data $G_{AY}$ and $G_{BY}$, wherein the distance between the reflecting point $PN_Y$ and the 3D image-sensing device 1000 is $D_Y$; the image-sensing controlling circuit 1080 respectively controls the light-sensing components $CSA_M$ and $CSB_M$ sensing the reflecting point $PN_M$ of the scene P so as to obtain the two sub-pixel image data $G_{AM}$ and $G_{BM}$ and so on. In this way, the 3D image-sensing device 100 can construct a 3D image by means of the sub-pixel image data $G_{A1} \sim G_{AM}$ and $G_{B1} \sim G_{BM}$, and the distance data $D_1 \sim D_M$.

In addition, the light-sensing groups $CS_1 \sim CS_M$ of the light-sensing module 1030 are CMOS or CCD light sensors. That is, the structure and the principle of the light-sensing module 1030 are similar to those of the image-sensing module of the digital camera. In other words, when the 3D image-sensing device is applied in the digital camera, the digital camera can control the light-sensing module 1030 sensing the scene so as to obtain the 2D image by means of the image-sensing controlling circuit 1080 of the 3D image-sensing device 1000, and also can measure each distance between each reflecting point of the scene and the digital camera so as to obtain each distance data corresponding to each pixel by means of the distance-measuring device 1090 of the 3D image-sensing device 1000. In this way, the digital camera can construct a 3D image according to the distance data and the 2D image. Since the 2D image-sensing device 1100 and the distance-measuring device 1090 of the 3D image-sensing device 1000 share the light-sensing module 1030, the cost of constructing the 3D image is reduces.

Figure 12:
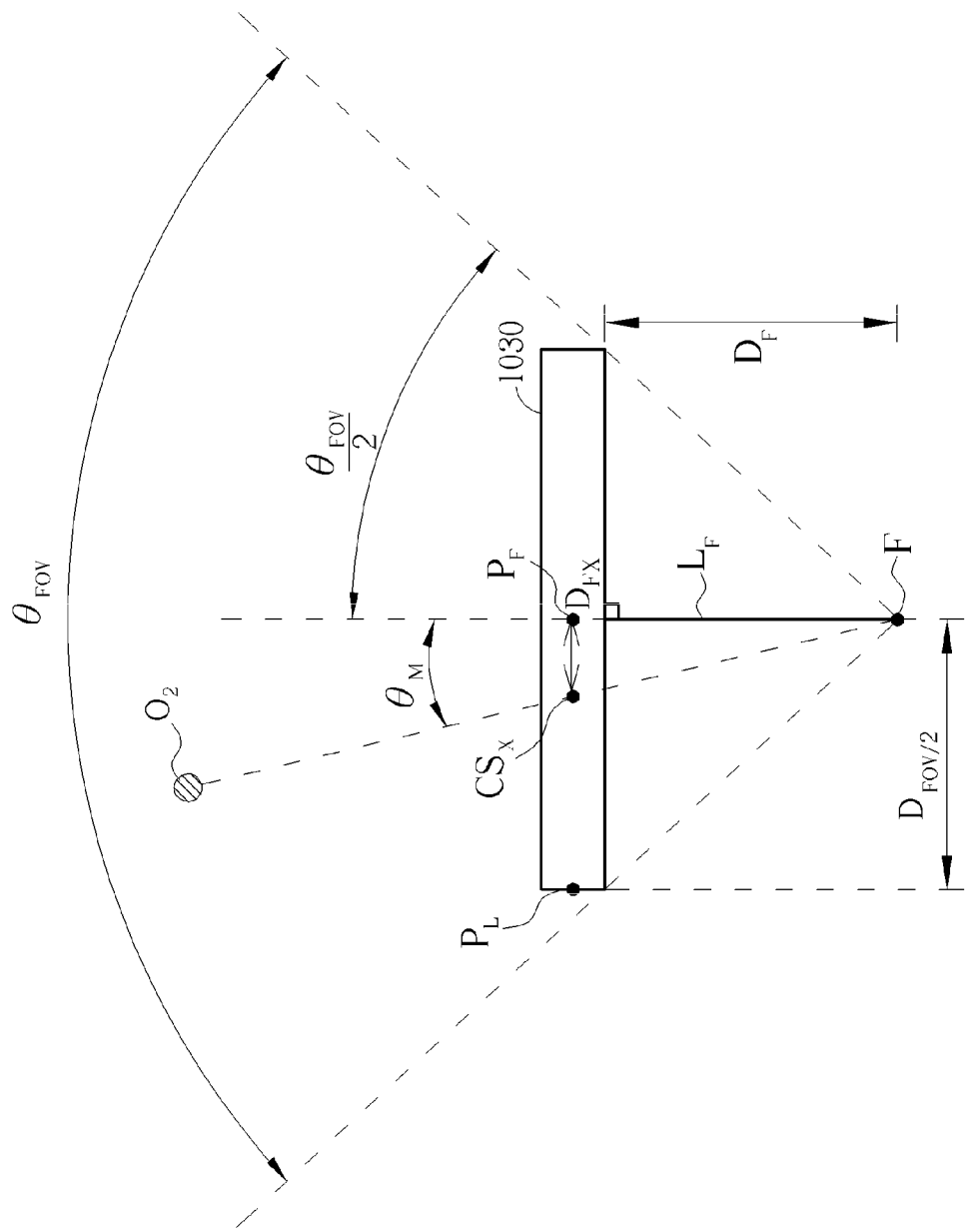
FIG. 12 is a diagram illustrating a method of the 3D image-sensing device measuring a measured angle between an indicating object and the 3D image-sensing device.

Please refer to FIG. 12. FIG. 12 is a diagram illustrating a method of the 3D image-sensing device 1000 measuring a measured angle $\theta_M$ between an indicating object $O_2$ and the 3D image-sensing device 1000. It is assumed that the light-sensing module 1030 has a focusing point F. The point that the focusing point F projects on the light-sensing module 1030 is a center point $P_F$ of the light-sensing module 1030. A middle line $L_F$ is formed between the focusing point F and the center point $P_F$, and the length of the middle line $L_F$ is equal to a predetermined distance $D_F$. The middle line $L_F$ is perpendicular to the surface of the light-sensing module 1030. In addition, the viewing angle corresponding to the sensing range of the light-sensing module 1030 is $\theta_{FOV}$, and the distance between one of the two end points of the two sides of the light-sensing module 1030 and the center point $P_F$ is the predetermined distance $D_{FOV}/2$. When the indicating object $O_2$ projects on light-sensing group $CS_X$ of the light-sensing module 1030 and the distance between the light-sensing group $CS_X$ and the center point $P_F$ is $D_{FX}$, the measured angle $\theta_M$ between the indicating object $O_2$ and the 3D image-sensing device 1000 can be represented as the following formula:

$$\theta_M = \tan^{-1}[\tan(\theta_{FOV}/2) \times (D_{FX}/D_F)/(D_{FOV/2}/D_F)] \quad (5)$$
$$= \tan^{-1}[\tan(\theta_{FOV}/2) \times (D_{FX}/D_{FOV/2})];$$

since the viewing angle $\theta_{FOV}$ and the distance $D_{FOV}/2$ is known, the distance $D_{FX}$ can obtained by means of summing the widths of the light-sensing groups between the light-sensing group $CS_X$ and the center point $P_F$. Hence, the measured angle $\theta_M$ between the indicating object $O_2$ and the 3D image-sensing device 1000 can be calculated according to the formula (5).

According to the above-mentioned, the measured distance $D_M$ and the measured angle $\theta_M$ between a measured object (or an indicating object) and the 3D image-sensing device 1000 can be detected by means of the 3D image-sensing device 1000.

Figure 13:
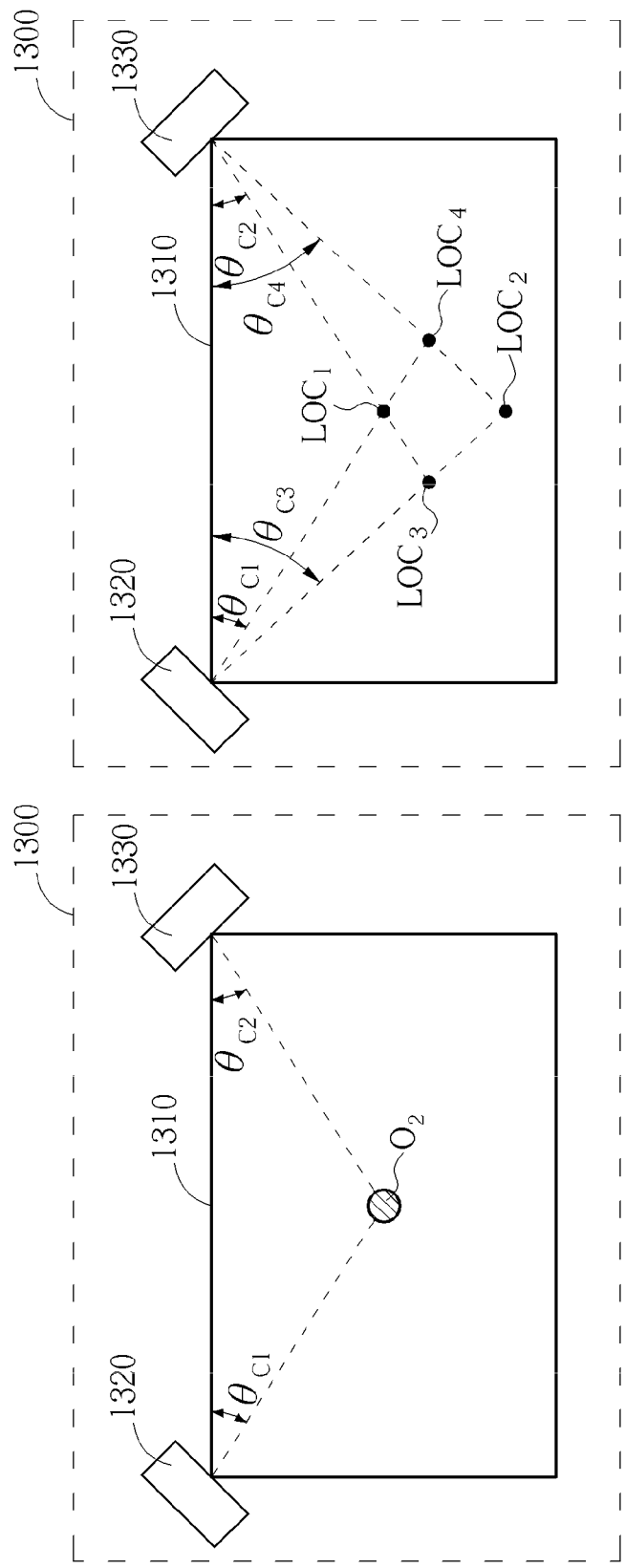
FIG. 13 is a diagram illustrating an optical touch system according to an embodiment of the present invention.

Please refer to FIG. 13. FIG. 13 is a diagram illustrating an optical touch system 1300 according to an embodiment of the present invention. The optical touch system 1300 comprises a display 1310, angle detectors 1320 and 1330, and a location-calculating circuit 1340 (not shown in FIG. 13). The display 1310 is utilized for displaying image. When the user touch the display panel 1310 through an indicating object $O_2$ (for example, a finger or a touch pen), the angle detectors 1320 and 1330 are respectively detects the indicating object $O_2$ so as to obtain touch angles $\theta_{C1}$ and $\theta_{C2}$ corresponding to the edge of the display 1310 (as shown in the left part of FIG. 13), and accordingly output to the location-calculating circuit 1340. The location-calculating circuit 1340 positions the location of the indicating object $O_2$ on the display 1310 according to the touch angles $\theta_{C1}$ and $\theta_{C2}$. In this way, the location-calculating circuit 1340 realizes the touch operation according to the location of the indicating object $O_2$. However, when two indicating objects (for example the indicating objects $O_2$ and $O_3$) touch the display 1310 at the same time, as shown in the right part of FIG. 13, the location-calculating circuit 1340 obtains the touch angles $\theta_{C1}$, $\theta_{C2}$, $\theta_{C3}$ and $\theta_{C4}$. Meanwhile, the location-calculating circuit 1340 can not determine the locations of the indicating objects $O_2$ and $O_3$ are $LOC_1$ and $LOC_2$, or $LOC_3$ and $LOC_4$. In other words, the optical touch system 1300 can not handle the situation that two indicating objects touch the display 1310 at the same time. That is, the optical touch system can not realize multi-touch operation.

Figure 14:
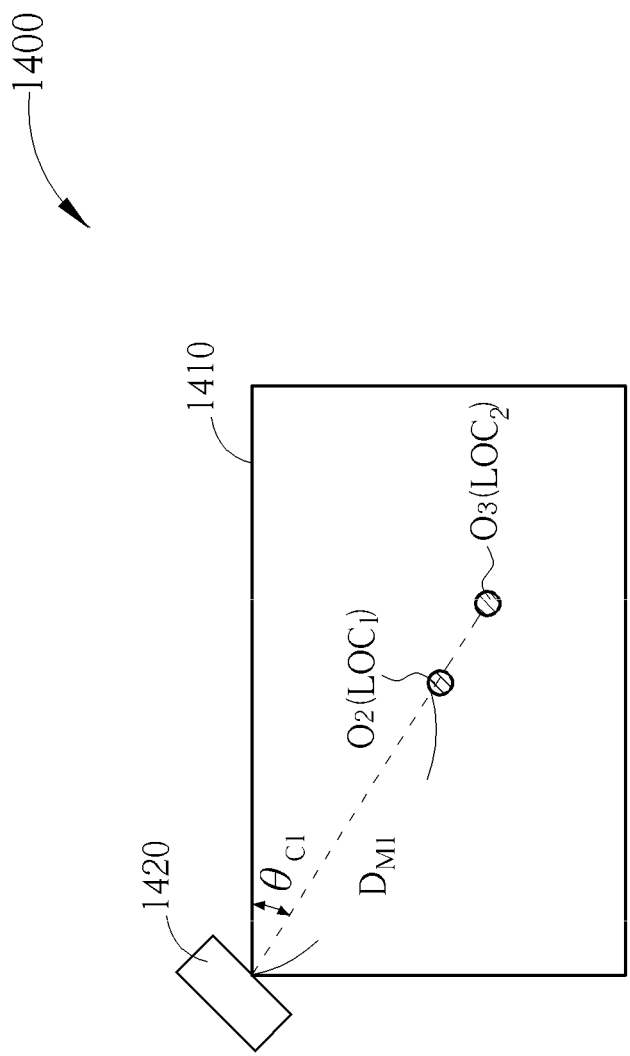
FIG. 14 is a diagram illustrating an optical touch system according to another embodiment of the present invention.

Please refer to FIG. 14. FIG. 14 is a diagram illustrating an optical touch system 1400 according to another embodiment of the present invention. The optical touch system 1400 comprises a display 1410, a 3D image-sensing device 1420, and a location-calculating circuit 1430 (not shown in FIG. 14). The structure and the operation principle of the display 1410 and the 3D image-sensing device 1420 are respectively similar to those of the display 1310 and the 3D image-sensing device 1420, and will not be repeated again for brevity. When the user touches the display 1410 through the indicating object $O_2$ (a finger or a touch pen), the 3D-image sensing device 1420 can detect the measured angle $\theta_{M1}$ and the measured distance $D_{M1}$ between the indicating object $O_2$ and the 3D-image sensing device 1420. The internal angle between the display 1410 and the 3D-image sensing device 1420 is a predetermined angle. Therefore, the location-calculating circuit 1430 can calculate the touch angle $\theta_{C1}$ between the indicating object $O_2$ and the display 1410 according the measure angle $\theta_{M1}$ outputted by the 3D image-sensing device 1420. In this way, the location-calculating circuit 1430 can calculate the location $LOC_1$ of the indicating object $O_2$ on the display 1410 according to the measured distance $D_{M1}$ outputted by the 3D image-sensing device 1420 and the touch angle $\theta_{C1}$ between the indicating object $O_2$ and the display 1410, so as to realize the touch operation. In addition, compared with the optical touch system 1300, in the optical touch system 1400, when two indicating objects $O_2$ and $O_3$ touch the display 1410 at the same time, the 3D image-sensing device 1420 outputs the measured distance $D_{M1}$ and the measured angle $\theta_{M1}$ corresponding to the indicating object $O_2$, and outputs the measured distance $D_{M2}$ and the measured angle $\theta_{M2}$ corresponding to the indicating object $O_3$. Thus, the location-calculating circuit 1430 calculates the touch angle $\theta_{C1}$ of the indicating object $O_2$ according to the measured angle $\theta_{M1}$, and calculates the location $LOC_1$ of the indicating object $O_2$ according to the measured distance $D_{M1}$ and the touch angle $\theta_{C1}$. The location-calculating circuit 1430 also calculates the touch angle $\theta_{C2}$ of the indicating object $O_3$ according to the measured angle $\theta_{M2}$, and calculates the location $LOC_2$ of the indicating object $O_3$ according to the measured distance $D_{M2}$ and the touch angle $\theta_{C2}$. That is, the optical touch system 1400 can realize the multi-touch operation. However, if the touch angles of the indicating objects $O_2$ and $O_3$ are equal (as shown in FIG. 14), since the indication object $O_3$ is covered by the indicating object $O_2$, the 3D image-sensing device 1420 only can detect the indicating object $O_2$ and can not detect the indicating object $O_3$. In other words, the location-calculating circuit 1430 only can calculate the location $LOC_1$ of the indicating object $O_2$. Hence, when two indicating objects touch the display 1410, the two indicating objects may be covered by each other, causing blind area when the 3D image-sensing device 1420 detects the indicating objects.

Figure 15:
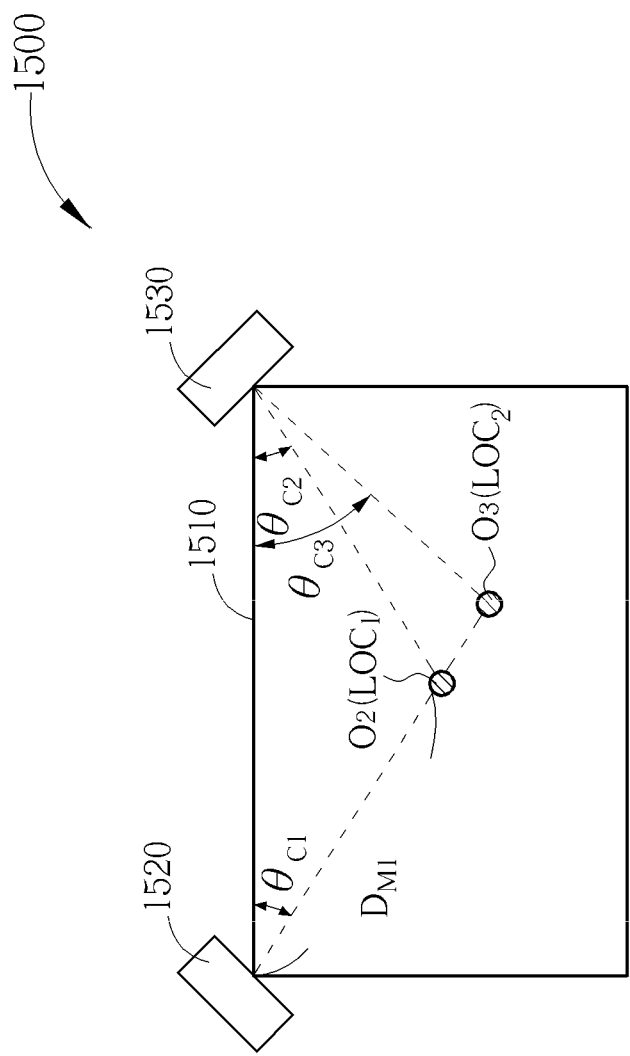
FIG. 15 is a diagram illustrating an optical touch system according to another embodiment of the present invention.

Please refer to FIG. 15. FIG. 15 is a diagram illustrating an optical touch system 1500 according to another embodiment of the present invention. The optical touch system 1500 comprises a display 1510, a 3D image-sensing device 1520, an angle detector 1530, and a location-calculating circuit 1540 (not shown in FIG. 15). The structure and the operation principle of the display 1510, the angle detector 1530, and the 3D image-sensing device 1520 are respectively similar to those of the display 1410, the angle detector 1330 (or 1320), and the 3D image-sensing device 1420, and will be omitted for brevity. Compared with the optical touch system, when the touch angles of the indicating objects $O_2$ and $O_3$ are equal (as the touch angle $\theta_{C1}$ shown in FIG. 15), since the angle detector 1530 can detect the touch angle $\theta_{C2}$ of the indicating object $O_2$ and the touch angle $\theta_{C3}$ of the indicating object $O_3$, the location-calculating circuit 1540 can calculate the location $LOC_2$ of the indicating object $O_3$ according to the touch angles $\theta_{C1}$ and $\theta_{C3}$. That is, compared with the optical touch system 1400, the optical touch system 1500 reduces the blind area when the 3D image-sensing device 1520 detects the indicating objects.

Figure 16:
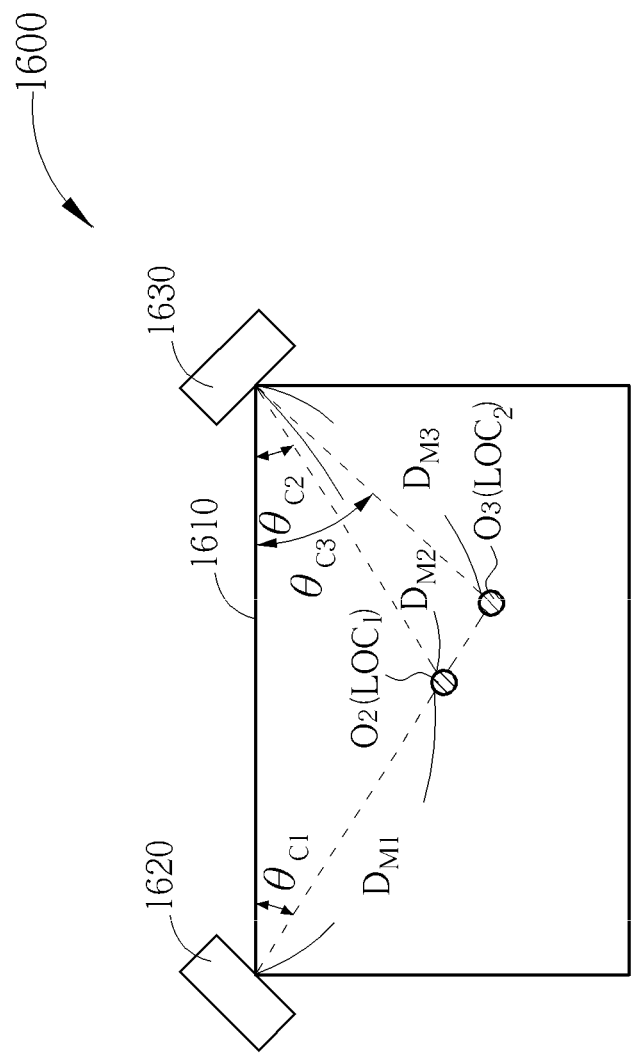
FIG. 16 is a diagram illustrating an optical touch system according to another embodiment of the present invention.

Please refer to FIG. 16. FIG. 16 is a diagram illustrating an optical touch system 1600 according to another embodiment of the present invention. The optical touch system 1600 comprises a display 1610, 3D image-sensing devices 1620 and 1630, and a location-calculating circuit 1640 (not shown in FIG. 16). The structure and the operation principle of the display 1610, and the 3D image-sensing devices 1620 and 1630 are respectively similar to those of the display 1410, and the 3D image-sensing device 1420, and will be omitted for brevity. Compared with the optical touch system 1400, when the touch angles of the indicating objects $O_2$ and $O_3$ are equal (as the touch angle $\theta_{C1}$ shown in FIG. 16), since the 3D image-sensing device 1630 can detect the measured angle $\theta_{M2}$ (not shown in FIG. 16) correspond to the indicating object $O_2$ and the measured angle $\theta_{M3}$ (not shown in FIG. 16) corresponding to the indicating object $O_3$, the location-calculating circuit 1640 can calculate the touch angle $\theta_{C3}$ of the indicating object $O_3$ according to the measured angle $\theta_{M3}$, and can calculate the location $LOC_2$ of the indicating object $O_3$ according to the touch angles $\theta_{C1}$ and $\theta_{C3}$. Hence, compared with the optical touch system 1400, the optical touch system 1600 reduces the blind area when the 3D image-sensing devices 1620 and 1630 detect the indicating objects. In addition, since the 3D image-sensing device can detect the measured distance $D_{M3}$ of the indicating object $O_2$, the location-calculating circuit 1640 also can calculate the location $LOC_2$ of the indicating object $O_3$ according to the measured distance $D_{M3}$ and the touch angle $\theta_{C3}$.

In conclusion, the distance-measuring device provided by the present invention reduces the effect of the background light and the measuring error when the measured distance is too long or the reflectivity of the measured object is too low, so that the distance-measuring device provided by the present invention can more correctly calculate the measured-distance. In addition, the 3D image-sensing device provided by the present invention senses a scene to form a 2D image, and measures the distances corresponding to the reflecting points of the scene, so that the 3D image-sensing device can construct a 3D image corresponding to the scene according to the 2D image and the distance data. The 2D image-sensing device and the distance-measuring device of the 3D image-sensing device of the present invention share the light-sensing module, reducing the cost of construct the 3D image. Besides, the optical touch system provided by the present invention realizes the multi-operation by means of the 3D image-sensing device, and reduces the blind area when the 3D image-sensing device detects the indicating objects.

Those skilled in the art will readily observe that numerous modifications and alterations of the device and method may be made while retaining the teachings of the invention.

What is claimed is:

1. A distance-measuring device, comprising:
a light-emitting/sensing controlling circuit, for generating a light-emitting periodic signal, a first shutter periodic signal, a second shutter periodic signal, a phase signal, a frequency-detecting signal, and a reading signal;
wherein the light-emitting periodic signal, the first shutter periodic signal, and the second shutter periodic signal have a same detecting frequency;
wherein the light-emitting periodic signal and the first shutter periodic signal are substantially in phase;
wherein a phase of the light-emitting periodic signal is substantially opposite to a phase of the second shutter periodic signal;
wherein the frequency-detecting signal indicates a magnitude of the detecting frequency;
a light-emitting component, for emitting a detecting light to a measured object according to the light-emitting periodic signal;
a light-sensing group, for sensing and accumulating an energy of a reflected light generated by the measured object reflecting the detecting light according to the first shutter periodic signal so as to generate a first light-sensing signal, and outputting the first light-sensing signal according to the reading signal, and sensing and accumulating the energy of the reflected light generated by the measured object reflecting the detecting light according to the second shutter periodic signal so as to generate a second light-sensing signal, and outputting the second light-sensing signal according to the reading signal;
a distance-calculating circuit, for calculating a measured distance between the distance-measuring device and the measured object according to the phase signal, the first light-sensing signal, the second light-sensing signal, and the frequency-detecting signal;
a background-calculating circuit, for outputting a background signal according to the phase signal, and the first light-sensing signal; and
a frequency-adjusting circuit, for outputting a frequency-controlling signal according to the phase signal and the first light-sensing signal so as to control the magnitude of the detecting frequency;
wherein the distance-calculating circuit calculates the measured distance between the distance-measuring device and the measured object according a ratio between the first light-sensing signal and the second light-sensing signal;
wherein when the phase signal represents background-measuring, the background-calculating circuit outputs the background signal according to the first light-sensing signal;
wherein the distance-calculating circuit calibrates the ratio between the first light-sensing signal and the second light-sensing signal according to the background signal;
wherein when the phase signal represents frequency-adjusting, the frequency-adjusting circuit compares the first light-sensing signal and a predetermined value so as to output the frequency-controlling signal;

wherein when the first light-sensing signal is smaller than the predetermined value, the frequency-adjusting circuit outputs the frequency-controlling signal representing reducing.

2. The distance-measuring device of claim 1, wherein when the frequency-controlling signal represents reducing, the light-emitting/sensing controlling circuit reduces the detecting frequency.

3. A distance-measuring device, comprising:
a light-emitting/sensing controlling circuit, for generating a light-emitting periodic signal, a first shutter periodic signal, a second shutter periodic signal, a phase signal, a frequency-detecting signal, and a reading signal;
wherein the light-emitting periodic signal, the first shutter periodic signal, and the second shutter periodic signal have a same detecting frequency;
wherein the light-emitting periodic signal and the first shutter periodic signal are substantially in phase;
wherein a phase of the light-emitting periodic signal is substantially opposite to a phase of the second shutter periodic signal;
wherein the frequency-detecting signal indicates a magnitude of the detecting frequency;
a light-emitting component, for emitting a detecting light to a measured object according to the light-emitting periodic signal;
a light-sensing group, for sensing and accumulating an energy of a reflected light generated by the measured object reflecting the detecting light according to the first shutter periodic signal so as to generate a first light-sensing signal, and outputting the first light-sensing signal according to the reading signal, and sensing and accumulating the energy of the reflected light generated by the measured object reflecting the detecting light according to the second shutter periodic signal so as to generate a second light-sensing signal, and outputting the second light-sensing signal according to the reading signal;
a distance-calculating circuit, for calculating a measured distance between the distance-measuring device and the measured object according to the phase signal, the first light-sensing signal, the second light-sensing signal, and the frequency-detecting signal; and
a background-calculating circuit, for outputting a background signal according to the phase signal, and the first light-sensing signal;
wherein the distance-calculating circuit calculates the measured distance between the distance-measuring device and the measured object according a ratio between the first light-sensing signal and the second light-sensing signal;
wherein when the phase signal represents background-measuring, the background-calculating circuit outputs the background signal according to the first light-sensing signal;
wherein the distance-calculating circuit calibrates the ratio between the first light-sensing signal and the second light-sensing signal according to the background signal;
wherein when the phase signal represents distance-calculating, the distance-measuring circuit calculates the measured distance according to a following formula:

$$D=[C/(4 \times F_C)] \times [(S_{LS2}-S_B/(2 \times F_C))/(S_{LS1}+S_{LS2}-S_B/F_C)];$$

wherein D represents the measured distance; $F_c$ represents the detecting frequency; C represents a speed of light; $S_{LS1}$ represents the first light-sensing signal; $S_{LS2}$ represents the second light-sensing signal; and $S_B$ represents the background signal.

4. A distance-measuring device, comprising:
a light-emitting/sensing controlling circuit, for generating a light-emitting periodic signal, a first shutter periodic signal, a second shutter periodic signal, a phase signal, a frequency-detecting signal, and a reading signal;
wherein the light-emitting periodic signal, the first shutter periodic signal, and the second shutter periodic signal have a same detecting frequency;
wherein the light-emitting periodic signal and the first shutter periodic signal are substantially in phase;
wherein a phase of the light-emitting periodic signal is substantially opposite to a phase of the second shutter periodic signal;
wherein the frequency-detecting signal indicates a magnitude of the detecting frequency;
a light-emitting component, for emitting a detecting light to a measured object according to the light-emitting periodic signal;
a light-sensing group, for sensing and accumulating an energy of a reflected light generated by the measured object reflecting the detecting light according to the first shutter periodic signal so as to generate a first light-sensing signal, and outputting the first light-sensing signal according to the reading signal, and sensing and accumulating the energy of the reflected light generated by the measured object reflecting the detecting light according to the second shutter periodic signal so as to generate a second light-sensing signal, and outputting the second light-sensing signal according to the reading signal; and
a distance-calculating circuit, for calculating a measured distance between the distance-measuring device and the measured object according to the phase signal, the first light-sensing signal, the second light-sensing signal, and the frequency-detecting signal;
wherein the light-sensing group comprises:
a first light-sensing component, comprising:
a first photo diode, coupled to a second voltage source, for generating and accumulating electrons of a first quantity according to the energy of the reflected light generated by the measured object reflecting the detecting light;
a first switch, comprising:
a first end, coupled to a first voltage source;
a second end, coupled to the first photo diode; and
a control end, for receiving a first shutter-on pulse signal;
wherein when the first switch receives the first shutter-on pulse signal, the first end of the first switch is coupled to the second end of the first switch so as to eliminate residual electrons of the first photo diode;
a second switch, comprising:
a first end, coupled to the first photo diode and the second end of the first switch;
a second end; and
a control end, for receiving a first shutter-off pulse signal;
wherein when the second switch receives the first shutter-off pulse signal, the first end of the second switch is coupled to the second end of the second switch;
a first capacitor, coupled between the second end of the second switch and the second voltage source;

a third switch, comprising:
  a first end, coupled to the first voltage source;
  a second end, coupled to the first capacitor and the second end of the second switch; and
  a control end, for receiving a first reset pulse signal; wherein when the third switch receives the first reset pulse signal, the first end of the third switch is coupled to the second end of the third switch;
a first transistor, comprising:
  a first end, coupled to the first voltage source;
  a second end; and
  a control end, coupled to the first capacitor and the second end of the second switch; and
a fourth switch, comprising:
  a first end, coupled to the second end of the first transistor;
  a second end, for outputting the first light-sensing signal; and
  a control end, for receiving a first output pulse signal; wherein when the fourth switch receives the first output pulse signal, the second end of the fourth switch is coupled to the first end of the fourth switch so as to output the first light-sensing signal; and
a second light-sensing component, comprising:
  a second photo diode, coupled to the second voltage source, for generating and accumulating electrons of a second quantity according to the energy of the reflected light generated by the measured object reflecting the detecting light;
  a fifth switch, comprising:
    a first end, coupled to the first voltage source;
    a second end, coupled to the second photo diode; and
    a control end, for receiving a second shutter-on pulse signal;
    wherein when the fifth switch receives the second shutter-on pulse signal, the first end of the fifth switch is coupled to the second end of the fifth switch so as to eliminate residual electrons of the second photo diode;
  a sixth switch, comprising:
    a first end, coupled to the second photo diode and the second end of the fifth switch;
    a second end; and
    a control end, for receiving a second shutter-off pulse signal;
    wherein when the sixth switch receives the second shutter-off pulse signal, the first end of the sixth switch is coupled to the second end of the sixth switch;
  a second capacitor, coupled between the second end of the sixth switch and the second voltage source;
  a seventh switch, comprising:
    a first end, coupled to the first voltage source;
    a second end, coupled to the second capacitor and the second end of the sixth switch; and
    a control end, for receiving a second reset pulse signal;
    wherein when the seventh switch receives the second reset pulse signal, the first end of the seventh switch is coupled to the second end of the seventh switch;
  a second transistor, comprising:
    a first end, coupled to the first voltage source;
    a second end; and
    a control end, coupled to the second capacitor and the second end of the sixth switch; and
  an eighth switch, comprising:
    a first end, coupled to the second end of the second transistor;
    a second end, for outputting the second light-sensing signal; and
    a control end, for receiving a second output pulse signal;
    wherein when the eighth switch receives the second output pulse signal, the second end of the eighth switch is coupled to the first end of the eighth switch so as to output the second light-sensing signal.

5. The distance-measuring device of claim 4, wherein the light emitting/sensing controlling circuit further comprises:
  a first driving circuit, for generating the first shutter-on pulse signal, the first shutter-off pulse signal, the first reset pulse signal, the first output pulse signal, the second shutter-on pulse signal, the second shutter-off pulse signal, the second reset pulse signal, and the second output pulse signal according to the first shutter periodic signal, the second shutter periodic signal, and the reading signal;
  wherein when the first shutter periodic signal changes from turning-off to turning-on, the first driving circuit generates the first shutter-on pulse signal;
  wherein when the first shutter periodic signal changes from turning-on to turning-off, the first driving circuit generates the first shutter-off pulse signal;
  wherein when the second shutter periodic signal changes from turning-off to turning-on, the first driving circuit generates the second shutter-on pulse signal;
  wherein when the second shutter periodic signal changes from turning-on to turning-off, the first driving circuit generates the second shutter-off pulse signal;
  wherein when the reading signal represents reading, the first driving circuit generates the first and the second output pulse signals, and then generates the first and the second reset pulse signals.

6. The distance-measuring device of claim 4, wherein when the light-emitting periodic signal represents emitting, the light-emitting component emits the detecting light; when the first shutter periodic signal represents turning-on, the first light-sensing component receives the energy of the reflected light generated by the measured object reflecting the detecting light; when the second shutter periodic signal represents turning-on, the second light-sensing component receives the energy of the reflected light generated by the measured object reflecting the detecting light.

7. The distance-measuring device of claim 4, wherein when the reading signal represents reading, the first light-sensing component outputs the first light-sensing signal and simultaneously resets accumulated energy of the first light-sensing component; when the reading signal represents reading, the second light-sensing component outputs the second light-sensing signal and simultaneously resets accumulated energy of the second light-sensing component.

8. A distance-measuring device, comprising:
  a light-emitting/sensing controlling circuit, for generating a light-emitting periodic signal, a first shutter periodic signal, a second shutter periodic signal, a phase signal, a frequency-detecting signal, and a reading signal;
    wherein the light-emitting periodic signal, the first shutter periodic signal, and the second shutter periodic signal have a same detecting frequency;
    wherein the light-emitting periodic signal and the first shutter periodic signal are substantially in phase;

wherein a phase of the light-emitting periodic signal is substantially opposite to a phase of the second shutter periodic signal;
wherein the frequency-detecting signal indicates a magnitude of the detecting frequency;
a light-emitting component, for emitting a detecting light to a measured object according to the light-emitting periodic signal;
a light-sensing group, for sensing and accumulating an energy of a reflected light generated by the measured object reflecting the detecting light according to the first shutter periodic signal so as to generate a first light-sensing signal, and outputting the first light-sensing signal according to the reading signal, and sensing and accumulating the energy of the reflected light generated by the measured object reflecting the detecting light according to the second shutter periodic signal so as to generate a second light-sensing signal, and outputting the second light-sensing signal according to the reading signal; and
a distance-calculating circuit, for calculating a measured distance between the distance-measuring device and the measured object according to the phase signal, the first light-sensing signal, the second light-sensing signal, and the frequency-detecting signal;
wherein the light-sensing group comprises:
a third photo diode, coupled to a fourth voltage source, for receiving the energy of the reflected light generated by the measured object reflecting the detecting light, so as to generate and accumulate electrons of a third quantity;
a ninth switch, comprising:
  a first end, coupled to a third voltage source;
  a second end, coupled to the third photo diode; and
  a control end, for receiving a third shutter-on pulse signal;
  wherein when the ninth switch receives the third shutter-on pulse signal, the first end of the ninth switch is coupled to the second end of the ninth switch so as to eliminate residual electrons of the third photo diode;
a tenth switch, comprising:
  a first end, coupled to the third photo diode and the second end of the ninth switch;
  a second end; and
  a control end, for receiving a third shutter-off pulse signal;
  wherein when the tenth switch receives the third shutter-off pulse signal, the first end of the tenth switch is coupled to the second end of the tenth switch;
a third capacitor, coupled between the second end of the tenth switch and the fourth voltage source;
an eleventh switch, comprising:
  a first end, coupled to the third voltage source;
  a second end, coupled to the third capacitor and the second end of the tenth switch; and
  a control end, for receiving a third reset pulse signal;
  wherein when the eleventh switch receives the third reset pulse signal, the first end of the eleventh switch is coupled to the second end of the eleventh switch;
a third transistor, comprising:
  a first end, coupled to the third voltage source;
  a second end; and
  a control end, coupled to the third capacitor and the second end of the tenth switch; and
a twelfth switch, comprising:
  a first end, coupled to the second end of the third transistor;
  a second end, for outputting the first light-sensing signal; and
  a control end, for receiving a third output pulse signal;
  wherein when the twelfth switch receives the third output pulse signal, the second end of the twelfth switch is coupled to the first end of the twelfth switch so as to output the first light-sensing signal;
a thirteenth switch, comprising:
  a first end, coupled to the third photo diode and the second end of the ninth switch;
  a second end; and
  a control end, for receiving a fourth shutter-off pulse signal;
  wherein when the thirteenth switch receives the fourth shutter-off pulse signal, the first end of the thirteenth switch is coupled to the second end of the thirteenth switch;
a fourth capacitor, coupled between the second end of the thirteenth switch and the fourth voltage source;
a fourteenth switch, comprising:
  a first end, coupled to the third voltage source;
  a second end, coupled to the fourth capacitor and the second end of the fourteenth switch; and
  a control end, for receiving a fourth reset pulse signal;
  wherein when the fourteenth switch receives the fourth reset pulse signal, the first end of the fourteenth switch is coupled to the second end of the fourteenth switch;
a fourth transistor, comprising:
  a first end, coupled to the third voltage source;
  a second end; and
  a control end, coupled to the fourth capacitor and the second end of the fourteenth switch; and
a fifteenth switch, comprising:
  a first end, coupled to the second end of the fourth transistor;
  a second end, for outputting the second light-sensing signal; and
  a control end, for receiving a fourth output pulse signal;
  wherein when the fifteenth switch receives the fourth output pulse signal, the second end of the fifteenth switch is coupled to the first end of the fifteenth switch so as to output the second light-sensing signal.

9. The distance-measuring device of claim 8, wherein the light emitting/sensing controlling circuit further comprises:
a second driving circuit, for generating the third shutter-on pulse signal, the third shutter-off pulse signal, the third reset pulse signal, the third output pulse signal, the fourth shutter-off pulse signal, the fourth reset pulse signal, and the fourth output pulse signal according to the first shutter periodic signal, the second shutter periodic signal, and the reading signal;
wherein when the first shutter periodic signal changes from turning-off to turning-on or the second shutter periodic signal changes from turning-off to turning-on, the second driving circuit generates the third shutter-on pulse signal;
wherein when the first shutter periodic signal changes from turning-on to turning-off, the second driving circuit generates the third shutter-off pulse signal;
wherein when the second shutter periodic signal changes from turning-on to turning-off, the second driving circuit generates the fourth shutter-off pulse signal;
wherein when the reading signal represents reading, the second driving circuit generates the third and the fourth output pulse signals, and then generates the third and the fourth reset pulse signals.

10. The distance-measuring device of claim 8, wherein when the light-emitting periodic signal represents emitting, the light-emitting component emits the detecting light; when the first shutter periodic signal represents turning-on, the light-sensing group receives the energy of the reflected light generated by the measured object reflecting the detecting light; when the second shutter periodic signal represents turning-on, the light-sensing group receives the energy of the reflected light generated by the measured object reflecting the detecting light.

11. The distance-measuring device of claim 8, wherein when the reading signal represents reading, the light-sensing group outputs the first light-sensing signal and simultaneously resets accumulated energy of the light-sensing group;

when the reading signal represents reading, the light-sensing group outputs the second light-sensing signal and simultaneously resets accumulated energy of the light-sensing group.

12. The distance-measuring device of claim 1, further comprising a focusing module for focusing the reflected light to the light-sensing group.

13. A 3D image-sensing device, comprising:

a light-emitting/sensing controlling circuit, for generating a light-emitting periodic signal, a first shutter periodic signal, a second shutter periodic signal, a phase signal, a frequency-detecting signal, and a reading signal;

wherein the light-emitting periodic signal, the first shutter periodic signal, and the second shutter periodic signal have a same detecting frequency;

wherein the light-emitting periodic signal and the first shutter periodic signal are substantially in phase;

wherein a phase of the light-emitting periodic signal is substantially opposite to a phase of the second shutter periodic signal;

wherein the frequency-detecting signal indicates a magnitude of the detecting frequency;

a light-emitting component, for emitting a detecting light to a scene according to the light-emitting periodic signal;

wherein the scene comprises M reflecting points;

a light-sensing module, for generating M first light-sensing signals and M second light-sensing signals, the light-sensing module comprising M light-sensing groups;

wherein a $K^{th}$ light-sensing group of the M light-sensing groups comprises a first light-sensing component, and a second light-sensing component;

wherein the first light-sensing group of the $K^{th}$ light-sensing group of the M light-sensing groups is utilized for sensing and accumulating an energy of a reflected light, which is generated by a $K^{th}$ reflecting point of the M reflecting points reflecting the detecting light, according to the first shutter periodic signal, so as to generate a $K^{th}$ first light-sensing signal of the M first light-sensing signals, and outputting the $K^{th}$ first light-sensing signal of the M first light-sensing signals according to the reading signal;

wherein the second light-sensing group of the $K^{th}$ light-sensing group of the M light-sensing groups is utilized for sensing and accumulating an energy of the reflected light, which is generated by the $K^{th}$ reflecting point of the M reflecting points reflecting the detecting light, according to the second shutter periodic signal, so as to generate a $K^{th}$ second light-sensing signal of the M second light-sensing signals, and outputting the $K^{th}$ second light-sensing signal according to the reading signal;

a distance-calculating circuit, for calculating M measured distances between the 3D image-sensing device and the M reflecting points of the scene according to the phase signal, the M first light-sensing signals, the M second light-sensing signals, and the frequency-detecting signal; and an image-sensing controlling circuit, for controlling the M light-sensing groups of the light-sensing module sensing the scene to generate a 2D image, the 2D image comprising $(2\times M)$ sub-pixel image data;

wherein the image-sensing controlling circuit respectively controls the first and the second light-sensing components of the $K^{th}$ light-sensing group of the M light-sensing groups sensing the $K^{th}$ reflecting points of the scene so as to obtain a $(2\times K)^{th}$ sub-pixel image data and a $(2\times K-1)^{th}$ sub-pixel image data of the $(2\times M)$ sub-pixel image data;

wherein $1 \leq K \leq M$, and M and K are positive integers.

14. The 3D image-sensing device of claim 13, wherein when the light-emitting periodic signal represents emitting, the light-emitting component emits the detecting light; when the first shutter periodic signal represents turning-on, the first light-sensing component of the $K^{th}$ of the light-sensing group of the M light-sensing groups receives the energy of the reflected light generated by the $K^{th}$ reflecting point of the scene reflecting the detecting light; when the second shutter periodic signal represents turning-on, the second light-sensing component of the $K^{th}$ of the light-sensing group of the M light-sensing groups receives the energy of the reflected light generated by the $K^{th}$ reflecting point of the scene reflecting the detecting light.

15. The 3D image-sensing device of claim 14, wherein when the reading signal represents reading, the first light-sensing component of the $K^{th}$ light-sensing group of the M light-sensing groups outputs the $K^{th}$ first light-sensing signal of the M first light-sensing signals and simultaneously resets accumulated energy of the first light-sensing component of the $K^{th}$ light-sensing group of the M light-sensing groups; when the reading signal represents reading, the second light-sensing component of the $K^{th}$ light-sensing group of the M light-sensing groups outputs the $K^{th}$ second light-sensing signal of the M second light-sensing signals and simultaneously resets accumulated energy of the second light-sensing component of the $K^{th}$ light-sensing group of the M light-sensing groups.

16. The 3D image-sensing device of claim 13, wherein the distance-calculating circuit calculates a $K^{th}$ measured distance of the M measured distances between the $K^{th}$ reflecting point of the scene and the 3D image-sensing device, according to a ratio between the $K^{th}$ first light-sensing signal of the M first light-sensing signals and the $K^{th}$ second light-sensing signal of the M second light-sensing signals.

17. The 3D image-sensing device of claim 16, further comprising:

a background-calculating circuit, for outputting M background signals according to the phase signal, and the M first light-sensing signals;

wherein when the phase signal represents background-measuring, the background-calculating circuit outputs a $K^{th}$ background signal of the M background signals according to the $K^{th}$ first light-sensing signal of the M first light-sensing signals;

wherein the distance-calculating circuit calibrates the ratio between the $K^{th}$ first light-sensing signal of the M first light-sensing signals and the $K^{th}$ second light-sensing signal of the M second light-sensing signals according to the $K^{th}$ background signal of the M background signals.

18. The 3D image-sensing device of claim 17, further comprising:
a frequency-adjusting circuit, for outputting a frequency-controlling signal according to the phase signal and the $K^{th}$ first light-sensing signal of the M first light-sensing signals so as to control the magnitude of the detecting frequency.

19. The 3D image-sensing device of claim 18, wherein when the phase signal represents frequency-adjusting, the frequency-adjusting circuit compares the $K^{th}$ first light-sensing signal of the M first light-sensing signals and a predetermined value so as to output the frequency-controlling signal;
wherein when the $K^{th}$ first light-sensing signal of the M first light-sensing signals is smaller than the predetermined value, the frequency-adjusting circuit outputs the frequency-controlling signal representing reducing.

20. The 3D image-sensing device of claim 19, wherein when the frequency-controlling signal represents reducing, the light-emitting/sensing controlling circuit reduces the detecting frequency.

21. The 3D image-sensing device of claim 13, further comprising a focusing module for focusing the reflected light, which is generated by the M reflecting points reflecting the detecting light, to the light-sensing module.

22. The 3D image-sensing device of claim 13, wherein the 3D image-sensing device constructs a 3D image according to the 2D image and the M measured distances between the 3D image-sensing device and the M reflecting points of the scene.

23. An optical touch system, comprising:
a display, for displaying images;
a first 3D image-sensing device, for detecting at least an indicating object so as to accordingly output a measured distance and a measured angle between the indicating object and the first 3D image-sensing device;
wherein an angle between the first 3D image-sensing device and the display is a first predetermined internal angle; and
a location-calculating circuit, for calculating a location of the indicating object on the display according to the measured distance, the measured angle, and the first predetermined internal angle;
wherein the first 3D image-sensing device comprises:
a light-emitting/sensing controlling circuit, for generating a light-emitting periodic signal, a first shutter periodic signal, a second shutter periodic signal, a phase signal, a frequency-detecting signal, and a reading signal;
wherein the light-emitting periodic signal, the first shutter periodic signal, and the second shutter periodic signal have a same detecting frequency;
wherein the light-emitting periodic signal and the first shutter periodic signal are substantially in phase;
wherein a phase of the light-emitting periodic signal is substantially opposite to a phase of the second shutter periodic signal;
wherein the frequency-detecting signal indicates a magnitude of the detecting frequency;
a light-emitting component, for emitting a detecting light to a scene according to the light-emitting periodic signal;
wherein the scene comprises M reflecting points;
a light-sensing module, for generating M first light-sensing signals and M second light-sensing signals, the light-sensing module comprising M light-sensing groups;
wherein a $K^{th}$ light-sensing group of the M light-sensing groups comprises a first light-sensing component, and a second light-sensing component;
wherein the first light-sensing group of the $K^{th}$ light-sensing group of the M light-sensing groups is utilized for sensing and accumulating an energy of a reflected light generated by a $K^{th}$ reflecting point of the M reflecting points reflecting the detecting light according to the first shutter periodic signal, so as to generate a $K^{th}$ first light-sensing signal of the M first light-sensing signals, and outputting the $K^{th}$ first light-sensing signal of the M first light-sensing signals according to the reading signal;
wherein the second light-sensing group of the $K^{th}$ light-sensing group of the M light-sensing groups is utilized for sensing and accumulating an energy of the reflected light generated by the $K^{th}$ reflecting point of the M reflecting points reflecting the detecting light according to the second shutter periodic signal, so as to generate a $K^{th}$ second light-sensing signal of the M second light-sensing signals, and outputting the $K^{th}$ second light-sensing signal according to the reading signal;
a distance-calculating circuit, for calculating M measured distances between the 3D image-sensing device and the M reflecting points of the scene according to the phase signal, the M first light-sensing signals, the M second light-sensing signals, and the frequency-detecting signal; and
an image-sensing controlling circuit, for controlling the M light-sensing groups of the light-sensing module sensing the scene to generate a 2D image, the 2D image comprising (2×M) sub-pixel image data;
wherein the image-sensing controlling circuit respectively controls the first and the second light-sensing components of the $K^{th}$ light-sensing group of the M light-sensing groups sensing the $K^{th}$ reflecting points of the scene so as to obtain a $(2\times K)^{th}$ sub-pixel image data and a $(2\times K-1)^{th}$ sub-pixel image data of the (2×M) sub-pixel image data;
wherein $1 \leq K \leq M$, and M and K are positive integers.

24. The optical touch system of claim 23, further comprising:
an angle detector, for detecting the indicating object so as to output a touch angle between the indicating object and the display to the location-calculating object.

25. An optical touch system, comprising:
a display, for displaying images;
a first 3D image-sensing device, for detecting at least an indicating object so as to accordingly output a measured distance and a measured angle between the indicating object and the first 3D image-sensing device;
wherein an angle between the first 3D image-sensing device and the display is a first predetermined internal angle;
a location-calculating circuit, for calculating a location of the indicating object on the display according to the measured distance, the measured angle, and the first predetermined internal angle; and
a second 3D image-sensing device, for detecting a first and a second indication objects, so as to accordingly output a third measured distance and a third measured angle between the first indicating object and the second 3D image-sensing device, and to output a fourth measured distance and a fourth measured angle between the second indicating object and the second 3D image-sensing device;

wherein the first 3D image-sensing device, detects the first and the second indication objects, so as to accordingly output a first measured distance and a first measured angle between the first indicating object and the first 3D image-sensing device, and to output a second measured distance and a second measured angle between the second indicating object and the first 3D image-sensing device;

wherein an angle between the second 3D image-sensing device and the display is a second predetermined internal angle;

wherein the location-calculating circuit calculates a first location of the first indicating object on the display and a second location of the second indicating object on the display, according to the first, the second, the third, and the fourth measured distances, and the first, the second, the third, and the fourth measured angles, and the first and the second predetermined internal angles;

wherein when the first indicating object, the second indicating object, and the first 3D image-sensing device are collinear, the location-calculating circuit calculates the first location and the second location according to the third measured distance, the fourth measured distance, the third measured angle, the fourth measured angle, and the second predetermined internal angle;

wherein when the first indicating object, the second indicating object, and the second 3D image-sensing device are collinear, the location-calculating circuit calculates the first location and the second location according to the first measured distance, the second measured distance, the first measured angle, the second measured angle, and the first predetermined internal angle.

26. The optical touch system of claim 25, wherein each of the first 3D image-sensing device and the second 3D image-sensing device comprises:

a light-emitting/sensing controlling circuit, for generating a light-emitting periodic signal, a first shutter periodic signal, a second shutter periodic signal, a phase signal, a frequency-detecting signal, and a reading signal;

wherein the light-emitting periodic signal, the first shutter periodic signal, and the second shutter periodic signal have a same detecting frequency;

wherein the light-emitting periodic signal and the first shutter periodic signal are substantially in phase;

wherein a phase of the light-emitting periodic signal is substantially opposite to a phase of the second shutter periodic signal;

wherein the frequency-detecting signal indicates a magnitude of the detecting frequency;

a light-emitting component, for emitting a detecting light to a scene according to the light-emitting periodic signal;

wherein the scene comprises M reflecting points;

a light-sensing module, for generating M first light-sensing signals and M second light-sensing signals, the light-sensing module comprising M light-sensing groups;

wherein a $K^{th}$ light-sensing group of the M light-sensing groups comprises a first light-sensing component, and a second light-sensing component;

wherein the first light-sensing group of the $K^{th}$ light-sensing group of the M light-sensing groups is utilized for sensing and accumulating an energy of a reflected light generated by a $K^{th}$ reflecting point of the M reflecting points reflecting the detecting light according to the first shutter periodic signal, so as to generate a $K^{th}$ first light-sensing signal of the M first light-sensing signals, and outputting the $K^{th}$ first light-sensing signal of the M first light-sensing signals according to the reading signal;

wherein the second light-sensing group of the $K^{th}$ light-sensing group of the M light-sensing groups is utilized for sensing and accumulating an energy of the reflected light generated by the $K^{th}$ reflecting point of the M reflecting points reflecting the detecting light according to the second shutter periodic signal, so as to generate a $K^{th}$ second light-sensing signal of the M second light-sensing signals, and outputting the $K^{th}$ second light-sensing signal according to the reading signal;

a distance-calculating circuit, for calculating M measured distances between the 3D image-sensing device and the M reflecting points of the scene according to the phase signal, the M first light-sensing signals, the M second light-sensing signals, and the frequency-detecting signal; and an image-sensing controlling circuit, for controlling the M light-sensing groups of the light-sensing module sensing the scene to generate a 2D image, the 2D image comprising (2×M) sub-pixel image data;

wherein the image-sensing controlling circuit respectively controls the first and the second light-sensing components of the $K^{th}$ light-sensing group of the M light-sensing groups sensing the $K^{th}$ reflecting points of the scene so as to obtain a $(2\times K)^{th}$ sub-pixel image data and a $(2\times K-1)^{th}$ sub-pixel image data of the (2×M) sub-pixel image data;

wherein $1 \leq K \leq M$, and M and K are positive integers.

* * * * *